US012152465B2

(12) United States Patent
Moyes

(10) Patent No.: US 12,152,465 B2
(45) Date of Patent: Nov. 26, 2024

(54) THRUST BEARING

(71) Applicant: Rotojar Innovations Limited, Abderdeen (GB)

(72) Inventor: Peter Barnes Moyes, Aberdeenshire (GB)

(73) Assignee: Rotojar Innovations Limited, Aberdeen (GB)

( * ) Notice: Subject to any disclaimer, the term of this patent is extended or adjusted under 35 U.S.C. 154(b) by 172 days.

(21) Appl. No.: 17/999,947

(22) PCT Filed: May 25, 2021

(86) PCT No.: PCT/EP2021/063913
§ 371 (c)(1),
(2) Date: Nov. 28, 2022

(87) PCT Pub. No.: WO2021/239735
PCT Pub. Date: Dec. 2, 2021

(65) Prior Publication Data
US 2023/0220731 A1 Jul. 13, 2023

(30) Foreign Application Priority Data

May 28, 2020 (GB) ..................... 2008026

(51) Int. Cl.
*F16C 17/04* (2006.01)
*E21B 4/00* (2006.01)
*F16C 27/02* (2006.01)

(52) U.S. Cl.
CPC .............. *E21B 4/003* (2013.01); *F16C 17/04* (2013.01); *F16C 27/02* (2013.01); *F16C 2352/00* (2013.01)

(58) Field of Classification Search
CPC ........ F16C 17/04; F16C 17/065; F16C 23/02; F16C 23/04; F16C 25/02; F16C 25/04; F16C 27/02; F16C 2352/00; E21B 4/003
See application file for complete search history.

(56) References Cited

U.S. PATENT DOCUMENTS 2,983,481 A * 5/1961 Tiraspolsky ............ E21B 4/003
  415/142
3,043,637 A * 7/1962 Biedendieck ........... F16C 17/04
  384/426

(Continued)

FOREIGN PATENT DOCUMENTS

DE 1073418 B 1/1960
DE 10346647 A1 5/2005

(Continued)

OTHER PUBLICATIONS

Examination Report for Great Britain Application No. 2008026.3 dated Nov. 5, 2020.

(Continued)

*Primary Examiner* — Phillip A Johnson
(74) *Attorney, Agent, or Firm* — Harness, Dickey & Pierce, P.L.C.

(57) ABSTRACT

A thrust bearing is described comprising first and second bearing assemblies (15, 17) rotatable relative to each and a plurality of axially arranged bearing stages (14a, 14b) formed between the first and second bearing assemblies (15, 17). Each bearing stage comprises a first load shoulder (16) provided on the first bearing assembly (15), a second load shoulder (18) provided on the second bearing assembly (17), a bearing structure (30) defined between the first and second load shoulders; and an extrudable component (32) forming part of the bearing structure. Wherein axial load applied between the first and second bearing assemblies (15, 17) in a first relative axial direction is transmitted between respec- (Continued)

tive pairs of first and second load shoulders via the extrudable components (32) of respective bearing structures (30). The extrudable components (30) provide for load balancing between each bearing stage (14*a*, 14*b*).

21 Claims, 17 Drawing Sheets

(56) References Cited

U.S. PATENT DOCUMENTS

| | | |
|---|---|---|
| 4,089,566 A | 5/1978 | Schmidt |
| 5,150,972 A | 9/1992 | Wenzel |
| 2010/0078177 A1 | 4/2010 | Parmeter et al. |

FOREIGN PATENT DOCUMENTS

| | | |
|---|---|---|
| FR | 2055975 A5 | 5/1971 |
| GB | 882326 A | 11/1961 |
| JP | 2000-262002 A | 9/2000 |
| WO | WO-2017/176283 A1 | 10/2017 |

OTHER PUBLICATIONS

International Preliminary Report on Patentability dated Dec. 8, 2022 for corresponding International Application No. PCT/EP2021/063913.
International Search Report and Written Opinion thereof dated Sep. 6, 2021 for corresponding International Application No. PCT/EP2021/063913.

* cited by examiner

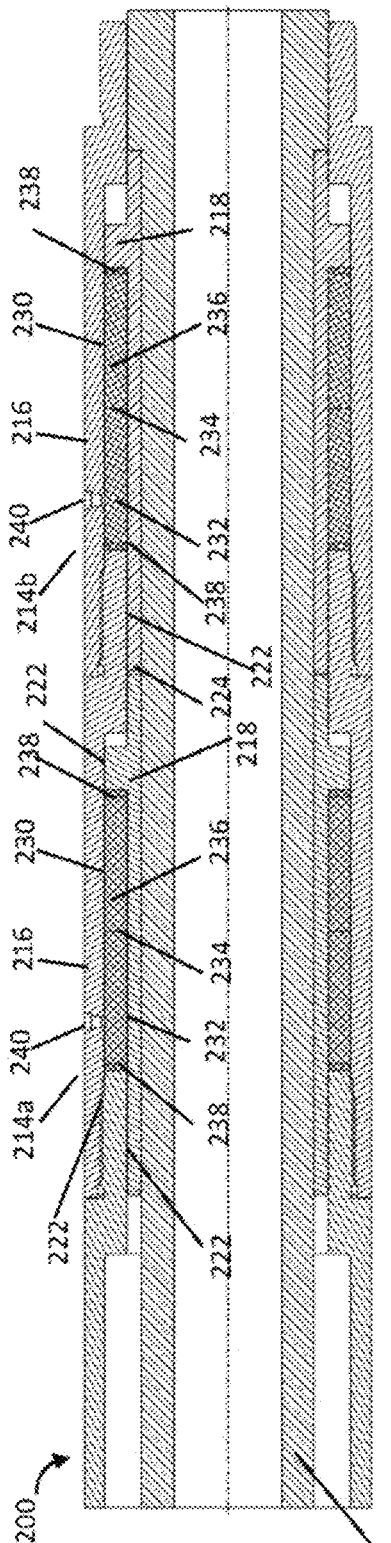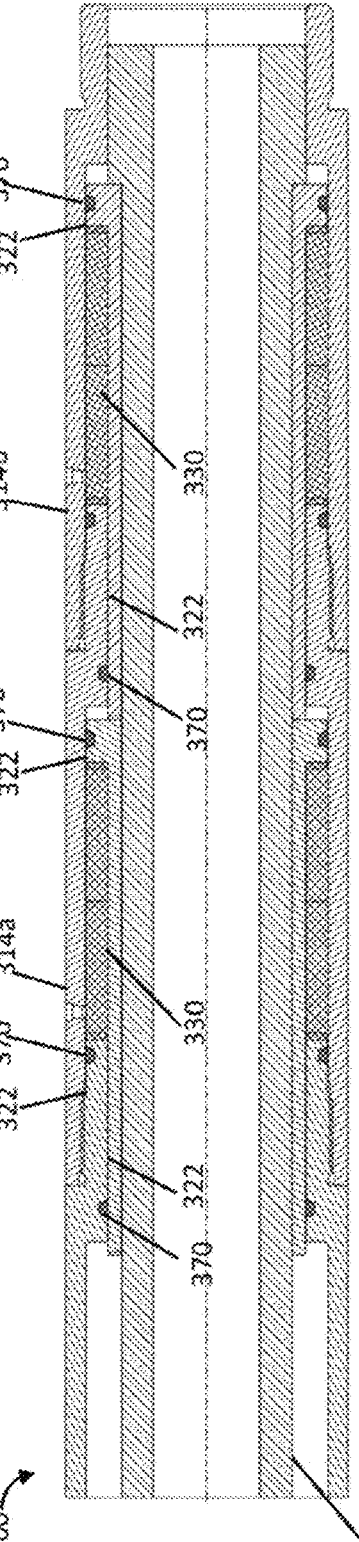
FIGURE 5
FIGURE 6

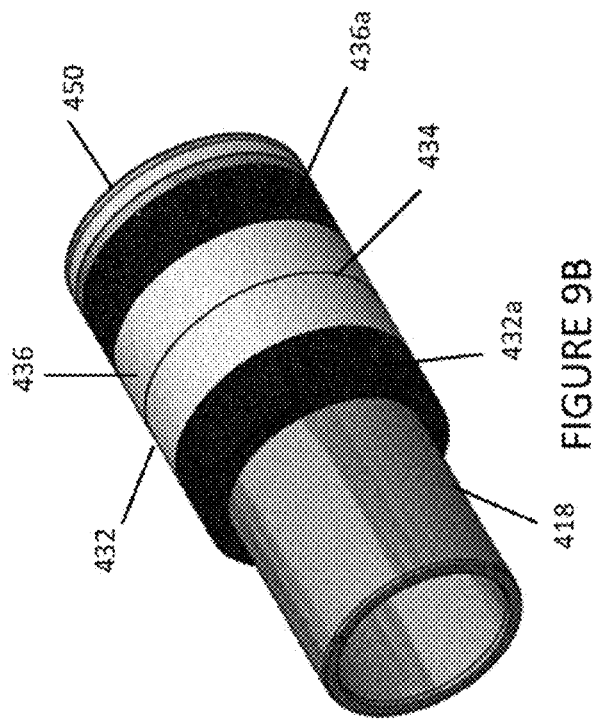
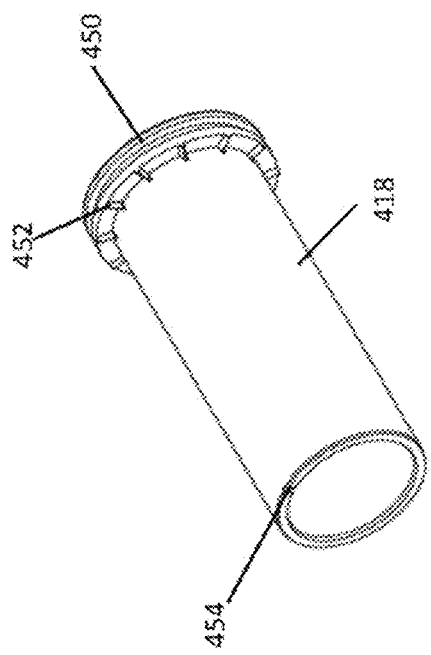
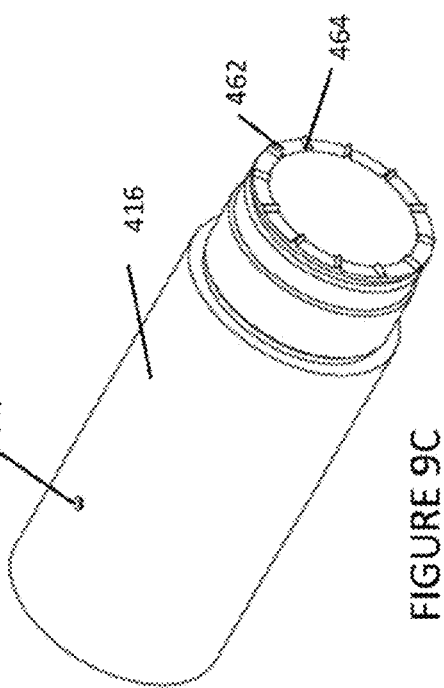

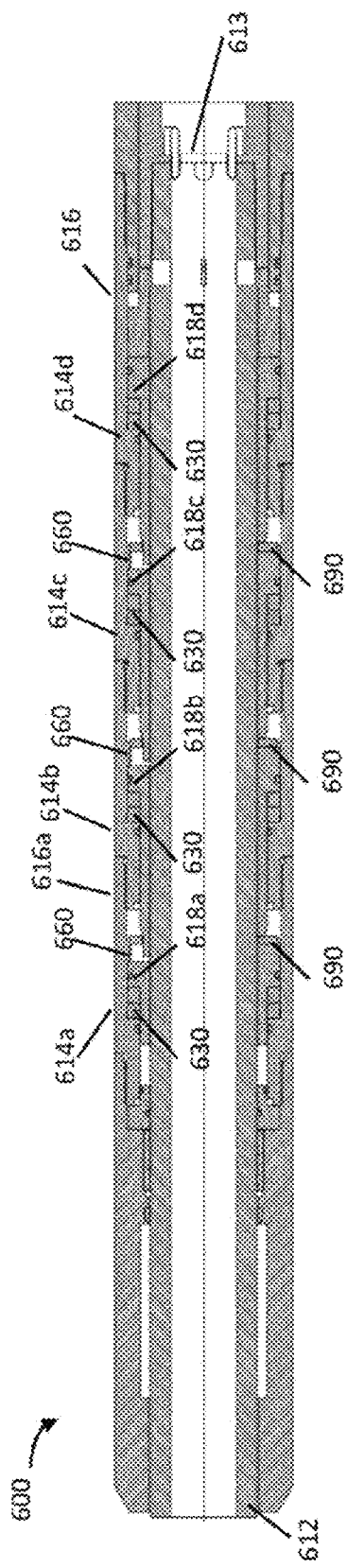
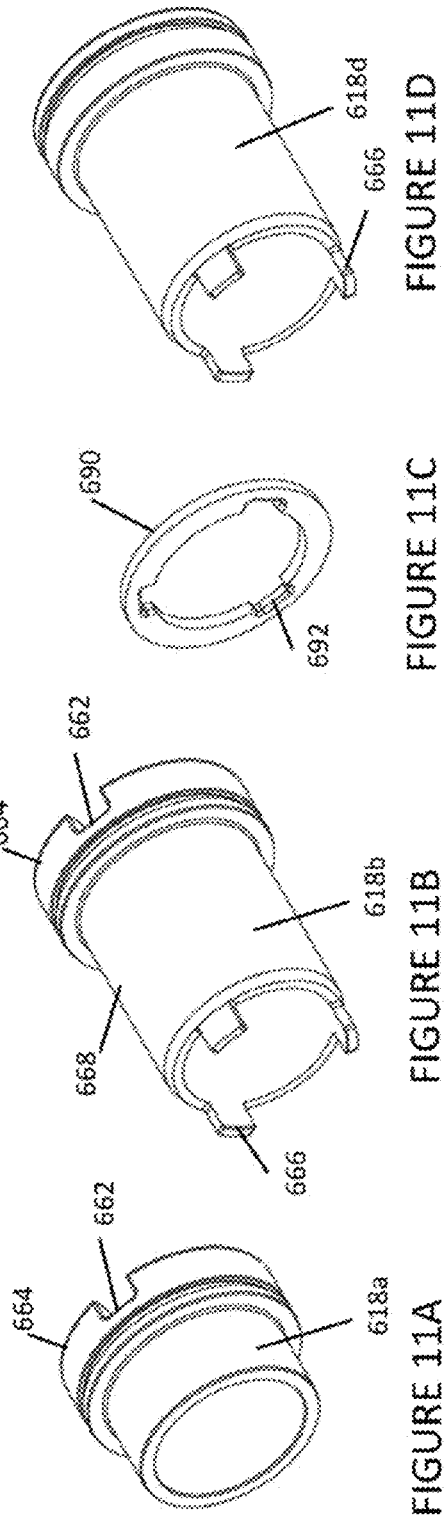
FIGURE 10
FIGURE 11A  FIGURE 11B  FIGURE 11C  FIGURE 11D

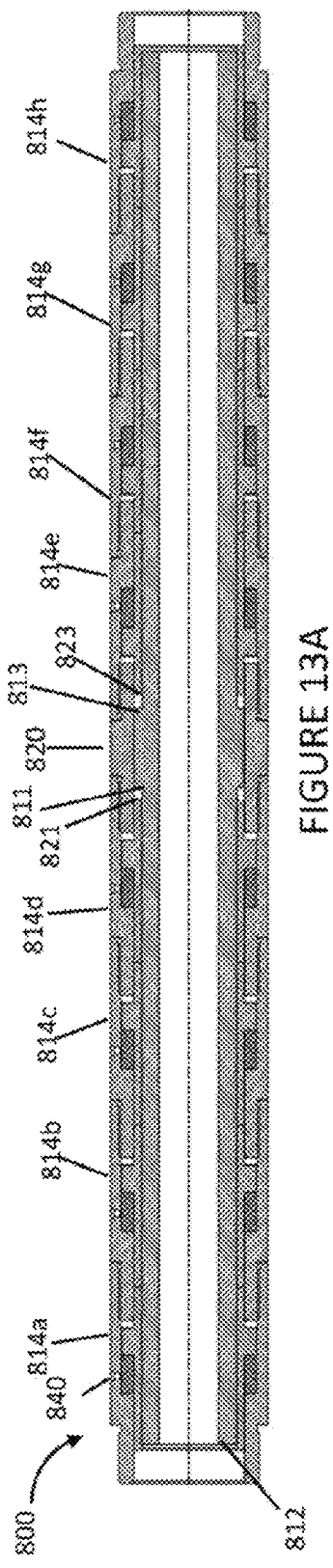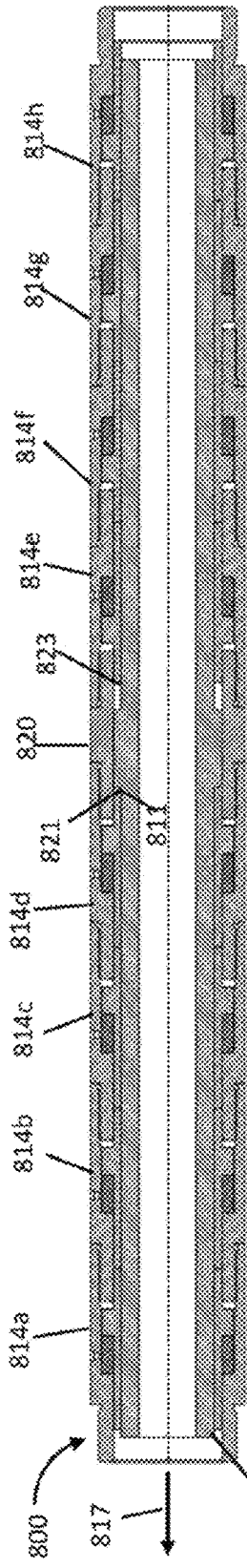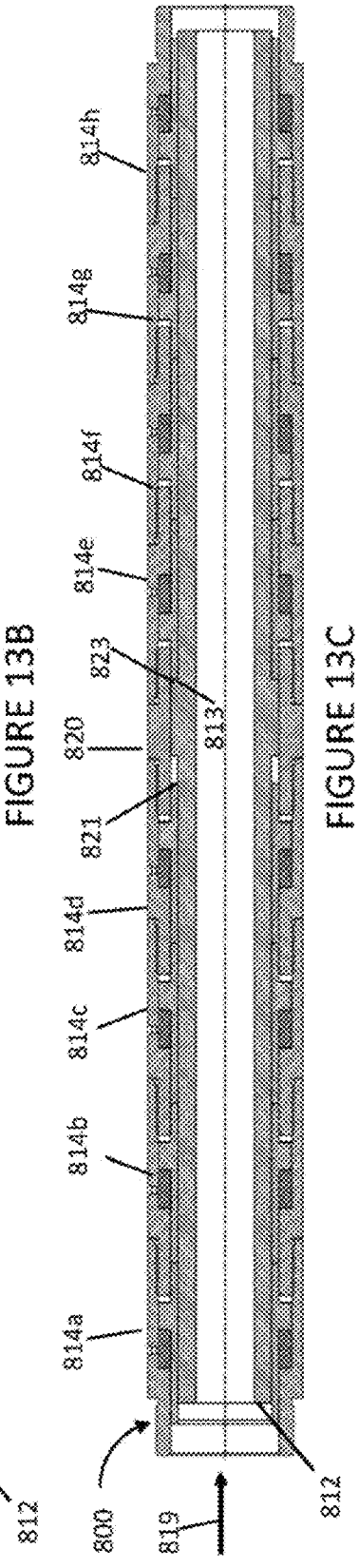
FIGURE 13A
FIGURE 13B
FIGURE 13C

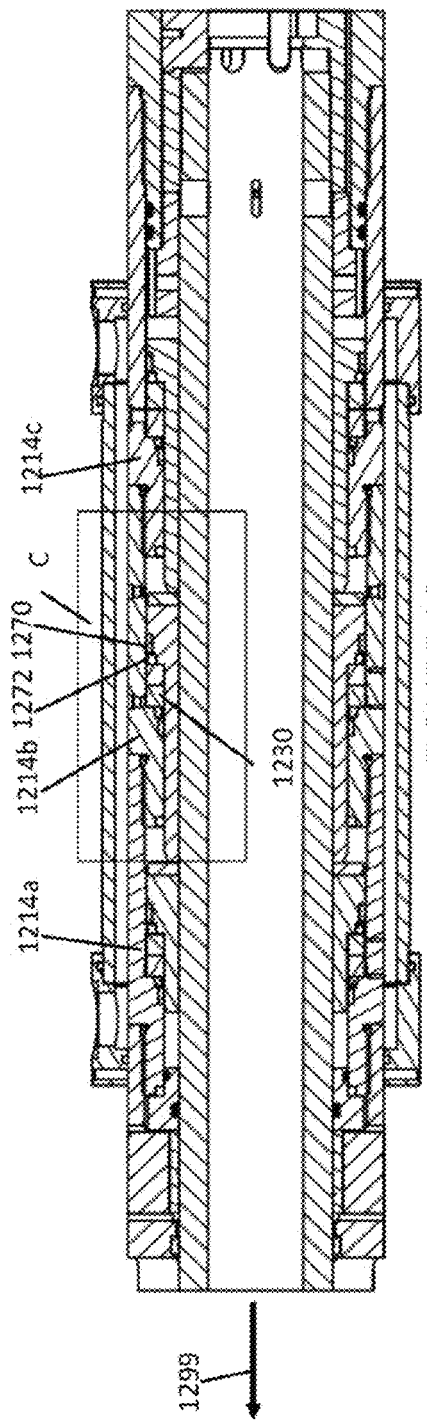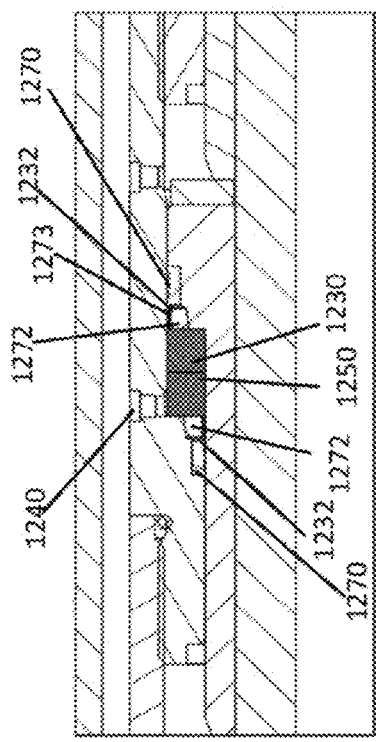
FIGURE 18
FIGURE 19

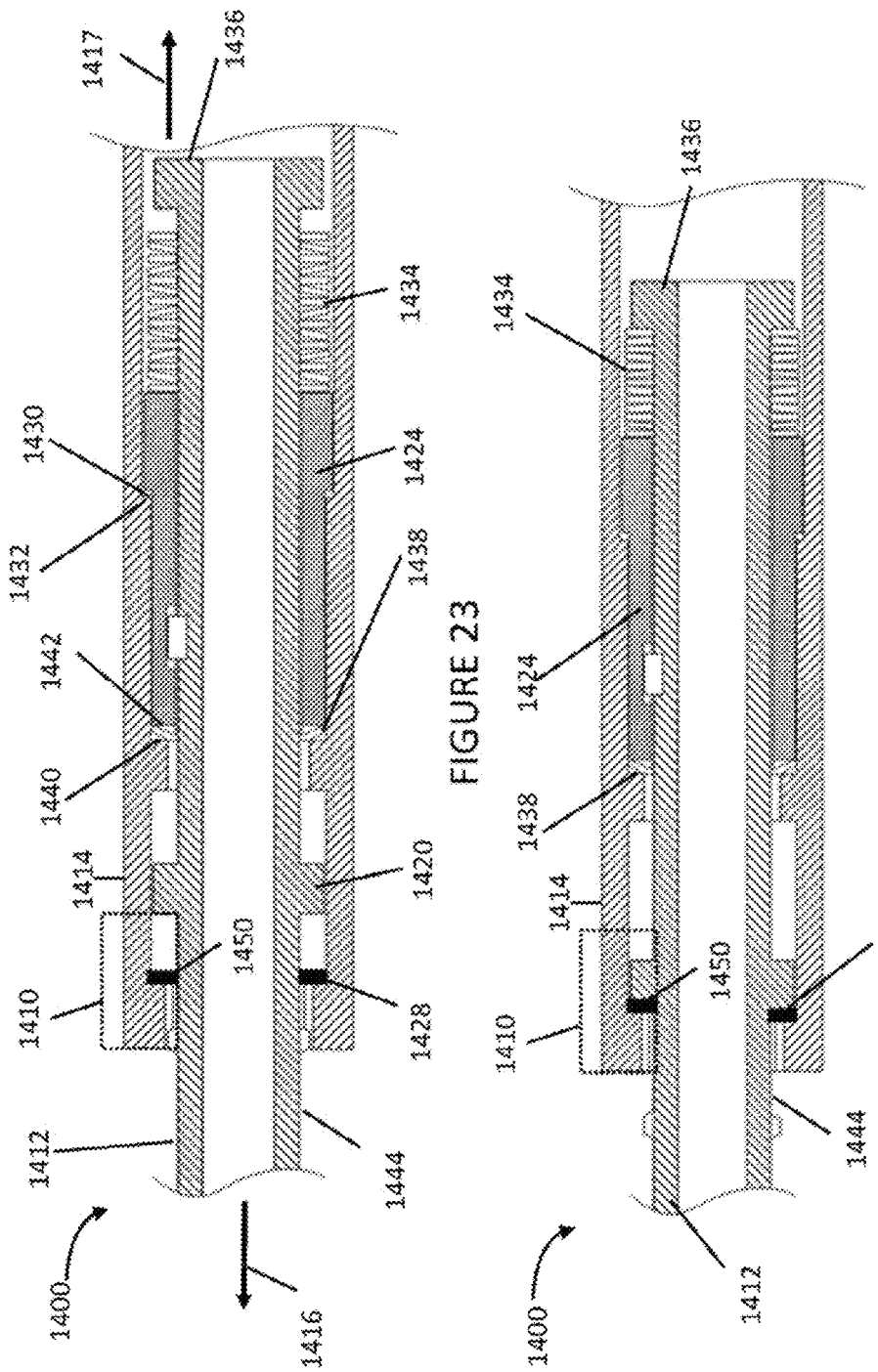

THRUST BEARING

CROSS-REFERENCE TO RELATED APPLICATIONS

This application is a national phase under 35 U.S.C. § 371 of PCT International Application No. PCT/EP2021/063913 which has an International filing date of May 25, 2021, which claims priority to Great Britain Application No. 2008026.3, filed May 28, 2020, the entire contents of each of which are hereby incorporated by reference.

FIELD

The present disclosure relates to a thrust bearing, for example for providing high thrust capacity.

BACKGROUND

Thrust bearings are used to permit rotation between parts, particularly when under axial loading. In the oil and gas industry, for example, there are many situations which involve rotation between parts at high axial loads, and as such thrust bearings are commonly required, with the reliability of the bearings having a significant impact on successfully and efficiently performing operations.

Mechanical thrust bearings are known, which typically include opposing bearing surfaces in rotary sliding contact, which may thus be subject to high wear rates, require lubrication and the like. The surface area of sliding contact may dictate the load capacity of the bearing, with larger loads typically accommodated with larger bearing surface areas. In some examples this may be achieved by increasing the diameter of the bearing. However, in some circumstances this might not suit applications with space restrictions, such as downhole applications.

SUMMARY

An aspect of the present disclosure relates to a thrust bearing. The thrust bearing may comprise first and second bearing assemblies rotatable relative to each other. The thrust bearing may comprise a plurality of axially arranged bearing stages which may be formed between the first and second bearing assemblies. Each bearing stage may comprise a first load shoulder, for example provided on the first bearing assembly and a second load shoulder, for example provided on the second bearing assembly. A bearing structure may be defined between the first and second load shoulders. An extrudable component may form part of the bearing structure. When an axial load is applied between the first and second bearing assemblies in a first relative axial direction, the axial load may be transmitted between respective pairs of first and second load shoulders via the extrudable components of respective bearing structures. The extrudable components may provide for load balancing between each bearing stage. As such, when the thrust bearing is under axial loading, the applied axial load may be distributed substantially equally across the bearing stages.

The extrudable components are extrudable under axial loading, providing load balancing between each bearing stages. In this way, the ability for the extrudable component to be extruded may permit the thrust bearing to seek a balanced condition such that an applied axial load is more evenly distributed across different bearing stages.

Axial loading applied to the bearing may act to bias the first and second load shoulders together, effectively seeking to cause the relative axial spacing therebetween to reduce. Such reduction in axial spacing will be resisted by the presence of the extrudable component. However, with sufficient applied load the extrudable component may be subject to extrusion (examples of which will be described below) to thus allow the relative spacing between the first and second load shoulders to adjust, facilitating load balancing with other bearing stages.

The extrudable components within the bearing structures may be preconfigured. For example, the bearing stages may be preconfigured to a load balanced configuration by extrusion of the extrudable components. This may be achieved prior to deployment, for example during manufacture of the thrust bearing. The load balanced configuration may also be achieved during initial operation of the thrust bearing, for example by permitting a degree of extrusion from each bearing structure whilst the bearing is under axial loading for use.

The load balanced configuration may be achieved during continued operation in which equilibrium between the bearing stages is continuously sought. That is, any load imbalance between the bearing stages may be readily addressed by the consequential disproportionate loading applied in one bearing stage causing disproportionate extrusion of the extrudable component within that bearing stage, until the balanced condition is achieved. In this regard, the thrust bearing may be defined as a self-adjusting, or self-balancing, multi-stage bearing.

Load balancing may be achieved by extrusion of the extrudable component, whereby a quantity of the extrudable material may be extruded from the bearing structure, and in some cases from the thrust bearing. In this regard, in some examples, the extrudable component may be considered to be consumable. Alternatively, or in addition, load balancing may be achieved by extrusion, for example in what may be considered in the form of deformation of the extrudable component within the bearing structure, whilst being maintained within the thrust bearing. In this respect, extrusion, or deformation, of the extrudable component may facilitate required adjustment of the relative axial spacing between the first and second load shoulders of a bearing stage, to thus facilitate load balancing. In this example, the extrudable component may be extruded, deformed or otherwise displaced away or out of a region axially between the first and second load shoulders. In the present disclosure the term "extrusion", "extrude", "extrudable" and similar, may be synonymous with terms such as "deformation", "deform", "deformable" and similar.

The provision of extrudable components for load balancing between each bearing stage may mitigate against load imbalance between stages of the thrust bearing during use of the thrust bearing, for example imbalances arising from engineering tolerances between bearing component parts. This may remove the need for exacting tolerances which are normally required in axially stacked mechanical thrust bearings to ensure appropriate contact loading is divided between stacked mechanical bearings in a controlled and desired manner. Additionally, during operation of the bearing, the extrudable components may be extruded as required in order to achieve load balancing again, and as such the provision of the extrudable components may also mitigate against the effects of uneven loads during use.

Additionally, the provision of an extrudable component as part of the bearing structure may provide the thrust bearing with an ability to accommodate bending during use of the thrust bearing. For example, if a thrust bearing is subject to a bending force, or if the bearing is subject to variations in the orientation of the load shoulders, and/or off axis misalignment, the extrudable component may deform accordingly to maintain an even axial and rotation load across the bearing structure. The extrudable component is deformable and as such, the extrudable component may accommodate variations in the alignment between the first and second load shoulders. In this respect, when the first and second load shoulders deviate from a primary relative alignment (wherein the first and second load shoulders are positioned in this primary relative alignment when the thrust bearing is not under load), the extrudable component may suitably deform to accommodate the deviation. This may permit more uniform load transmission between the first and second load shoulders to be maintained.

The thrust bearing may be defined as an axially stacked thrust bearing. In this respect, a design requirement to accommodate a higher load may be met by increasing the number of bearing stages, thus axially extending the thrust bearing. Such axial extension may minimise the requirement to meet a high load design requirement by increasing the diameter of the thrust bearing, which may not be desirable or indeed possible in some deployments, such as in downhole applications where available diameters are often very restricted. Further, such additional load capabilities by axial extension rather than increasing any diameter may permit any flow bore diameter through the thrust bearing to be maintained, or even maximised.

In some examples, the thrust bearing may define a modular structure, permitting more ready adaptation to meet specific design requirements by allowing the requisite number of bearing stages to be provided without requiring bespoke solutions in each case. For example, stacking or assembling standardised modules as required may permit a desired bearing design to be achieved. For example, the bearing stages may be modular and allow for rotary or non-rotary connections to an adjacent bearing stage. Alternatively, the bearing stages may be integrally formed.

Having the extrudable component, which can be extruded in order to balance an axial load across the bearing stages, may assist to minimise the requirement for very accurate stack-up tolerances which would otherwise be required in similarly modular axially stacked mechanical type thrust bearings.

The bearing structure may accommodate the extrudable component between the first and second load shoulders. The extrudable component may be joined to the first or second load shoulders by any suitable means, for example moulding, bonding, fusing, integrally forming and/or the like. The first or second load shoulders may comprise a portion for accommodating the extrudable bearing component. For example, one of the first or second load shoulders may comprise an annular rib configured to receive the extrudable component. The portion for accommodating the extrudable component may comprise a locking mechanism, such as a rotary locking mechanism, which may, for example, include splines or teeth. The locking mechanism may rotationally lock the extrudable component relative to one of the first or second load shoulders.

The bearing structures may be configured so that there is no fluid communication therebetween.

At least one bearing stage may comprise a port. The port may be in communication with the bearing structure. The first and second load shoulder may define a cavity there between. The cavity may comprise the bearing structure. The port may be in communication with the cavity. The provision of a port may facilitate extrusion of the extrudable component to achieve a balanced load across bearing stages.

Where the thrust bearing is pre-configured to a load balanced configuration by extrusion of the extrudable component or components prior to use, the port may be sealed once the stages are load balanced, prior to use. The closed port may form a seal.

At least one bearing stage may comprise a single extrudable component between the first and second load shoulders. The single extrudable component may form part of the bearing structure. A bearing interface may be formed between the extrudable component and one of the first and second load shoulders. The extrudable component may be rotatably fixed to one of the first or second load shoulders, whereby the bearing interface may be between the extrudable component and the other of the first or second load shoulders.

In use, the extrudable component provided at the bearing interface may accommodate an applied axial load and frictional forces generated during relative rotation between the first and second bearing assemblies. The provision of an extrudable component at the bearing interface may reduce wear rates, friction heating, lubrication issues and the like resulting from use of the thrust bearing.

At least one bearing stage may comprise multiple extrudable components between the first and second load shoulders. Multiple extrudable components may comprise at least two extrudable components. The multiple extrudable components forming part of the bearing structure. The extrudable components may comprise different extrusion properties, for example increased resistance to extrusion, rigidity or the like. The extrudable components may comprise the same extrusion properties, for example they may comprise the same extrudable material.

A bearing interface may be formed between two of the extrudable components. For example, one extrudable component may be rotatably fixed to the first load shoulder and one may be rotatably fixed to the second load shoulder. In use, the bearing interface being provided between extrudable components may accommodate an applied axial load and frictional forces generated during relative rotation between the first and second bearing assemblies.

Accordingly, the extrudable component may also be defined as an extrudable bearing component. The extrudable bearing component may also be defined as an extrudable load balancing component.

During use of the thrust bearing, the extrudable component of the bearing stages may have a propensity to be extruded through extrusion gaps within the thrust bearing. Extrusion gaps may be formed between the joints of bearing component parts, for example between the first and second bearing assemblies.

The bearing interface may be selectively located within the bearing structure so as to minimise further extrusion of the extrudable component while the thrust bearing is in use, for example whilst the thrust bearing is load balanced across the bearing stages. Locating the bearing interface away from any, or some extrusion gaps may, for example allow for heat generated during use of the bearing to dissipate through the extrudable component prior to any extrusion occurring through the extrusion gaps.

For example, the bearing interface may be located offset from a port, where a port is provided. If the port were located at or very close to the bearing interface, during the extrusion process to balance the bearing stages, for example preconfiguring the stages prior to use, extrusion of the extrudable component through the port would occur at the bearing interface, resulting in a degree of deformation at the bearing interface. This could have detrimental effects on the performance of the thrust bearing. Accordingly, locating the port offset from the bearing interface may ensure that no defects or deformation are introduced to the bearing component at the interface, during the load balancing process.

In some examples, the bearing interface may be located centrally, or offset from the axial ends of the bearing structure. This may provide for an increased axial distance between the bearing interface and an extrusion gap at the axial end of the bearing structure. Heat generated during use of the bearing, at the bearing interface, may therefore dissipate through the extrudable component or components which may reduce the likelihood of further extrusion from extrusion gaps.

The axial length of the bearing structure may be configured to minimise extrusion of the extrudable component or components while the thrust bearing is in use, for example whilst the thrust bearing is load balanced across the bearing stages. For example, the length of the bearing structure may be sufficiently long to allow for heat generated at the bearing interface (from, for example, friction during relative rotation of the bearing) to dissipate through the extrudable component or components.

The bearing structure may be filled with the extrudable component or components. Therefore, the axial length of the bearing structure may determine the axial length of the extrudable bearing component.

The thrust bearing may optionally be provided with a pre-load arrangement. For example, a spring may be provided to supply this pre-load. The spring may be a disc spring. Multiple springs may be provided. Multiple pre-load arrangements may be provided. For example, each bearing stage may comprise a pre-load arrangement. A pre-load arrangement may be provided between each bearing stage. A pre-load arrangement may be interposed between adjacent bearing stages. In this example, any pre-loading arrangement may be configured to accommodate a rotary connection between adjacent bearing stages, for example between adjacent first load shoulders, or adjacent second load shoulders. A pre-load arrangement may be provided within the bearing structure. Providing a degree of pre-loading between each bearing stage may assist in accommodating thermal expansion between the stages of the thrust bearing during use. The pre-load arrangement may act to maintain frictional contact within each bearing stage and thus may ensure that each bearing stage will be subject to operational heating while the bearing is under axial loading. Accordingly, the pre-load arrangement may ensure that when the thrust bearing is subject to axial loading, each bearing stage will carry a portion of the applied load.

The thrust bearing may comprise at least one anti-extrusion arrangement. At least one or each bearing stage may comprise an anti-extrusion arrangement. The anti-extrusion arrangement may be provided to restrict extrusion of the extrudable component from its bearing stage. The anti-extrusion arrangement may accommodate a degree of extrusion of the deformable component from or within its bearing stage to maintain load balance between the bearing stages. That is to say, the anti-extrusion arrangement may allow a degree of extrusion of the extrudable component(s) to achieve a balanced load across the bearing stages.

For example, the anti-extrusion arrangement may be configured to prevent a large degree of extrusion of the extrudable component. For example, the anti-extrusion arrangement may be configured to prevent extrusion up to a load threshold, and permit extrusion above this threshold. In this respect, the form of the anti-extrusion arrangement may be readily selected by a person of skill in the art to achieve extrusion above the required load threshold. In some cases, a precise load threshold may not be necessary, and the initiation of extrusion may be acceptable within a large degree of tolerance.

In some examples, the anti-extrusion arrangement may comprise a physical anti-extrusion barrier, for example in the form of a seal, anti-extrusion or back-up ring and/or the like. The anti-extrusion arrangement may alternatively or additionally comprise a labyrinth structure, for example by ensuring any extrusion gaps are minimised, by providing convoluted extrusion paths and/or the like.

The anti-extrusion arrangement may be configured to prevent leakage or loss of an extrudable component from its bearing stage, while still allowing the extrudable component to extrude or deform for the purposes of load balancing. In this example the anti-extrusion arrangement may be configured to accommodate a degree of extrusion or deformation of the extrudable component within its associated bearing stage in order to accommodate changes in the relative spacing between first and second load shoulders to achieve load balancing across the bearing stages, whilst preventing the extrudable component from leaking or being lost from its associated bearing stage.

The anti-extrusion arrangement may be extrudable or deformable. In this example, extrusion or deformation of an extrudable component may apply a load or pressure on the anti-extrusion arrangement, causing the anti-extrusion arrangement to be preferentially extruded or deformed. In this way, the anti-extrusion arrangement may function to retain the extrudable component within its bearing stage while accommodating the required deformation or extrusion of the extrudable component for the purpose of permitting adjustment between first and second load shoulders and facilitating load balancing.

At least one and in some examples all of the bearing stages may comprise a cavity which is configured to receive an extruded or deformed portion of an associated extrudable component. In such an example, extrusion of the extrudable component when under load may be permitted without or with minimal loss of the extrudable component from the bearing stage. In some examples the cavity may be initially defined between the extrudable component and an anti-extrusion arrangement, such that initial separation is provided between the extrudable component and the anti-extrusion arrangement. Such an arrangement may at least initially prevent frictional engagement between the extrudable component and the anti-extrusion arrangement may me otherwise generate undesired heating in this region, which might adversely affect the anti-extrusion function.

In some examples, a spacer arrangement may be provided to space the extrudable component from the anti-extrusion arrangement. The spacer arrangement may be configured to be rotatably secured relative to one of the first and second load shoulders, for example via physical interlocking, a taper lock and/or the like.

The first load shoulders of each bearing stage may be configured to be rotatably coupled to one another. In this regard, the first load shoulders may be provided with threaded connections.

The second load shoulders of each bearing stage may be rotatable relative to one another. For example, no specific mechanical or rigid rotary connection may be provided between adjacent second load shoulders. In this example, opposing end faces of adjacent second load shoulders may be in abutting engagement, such that, in use, frictional forces generated therebetween may facilitate transmission of rotation between said adjacent second load shoulders.

The second load shoulders of each bearing stage may be rotatably coupled to one another. For example, the second load shoulders may be provided with a mechanical rotary connection therebetween. In one example, the rotary connection may comprise complementary slot and tab arrangements.

Providing a rotatable connection between adjacent second load shoulders may mitigate against issues resulting from variable thermal expansion between the stages of the thrust bearing. For example, should the circumstance arise where one bearing stage is subject to a greater axial load than one or more other bearing stages, for example due to more extensive thermal expansion, the provision of the rotary connection will ensure that the one or more other bearing stages will not simply cease any rotating operation, and will maintain a degree of rotary friction and thus heating, until such time as the overloaded bearing stage might self-adjust, for example by wear, extrusion and/or the like of the extrudable component. In this respect, should the other bearing stages be allowed to cool, these bearing stages may exhibit a large drag torque following any self-adjusting phase of an overloaded bearing stage.

The extrudable component in each of the bearing structures may comprise the same extrudable material.

The extrudable component may comprise variable properties. For example, the extrudable component may comprise varying mechanical properties which may facilitate regions with greater resistance to extrusion. The extrudable component may comprise varying thermal conductivity. The extrudable component may comprise varying physical dimension to provide regions with greater resistance to extrusion. The extrudable component may comprise a portion of extrudable material with increased resistance to extrusion. The portion having increased resistance to extrusion may located axially offset from the bearing interface. The portion having increased resistance to extrusion may be located adjacent to any extrusion gaps. The provision of a portion having increased resistance to extrusion may assist in minimising further extrusion of the extrudable bearing component while the thrust bearing is in use. Selectively locating the portion having increased resistance to extrusion adjacent to any extrusion gaps may also assist in preventing or minimising extrusion of the extrudable material through the extrusion gaps. Accordingly, the thrust bearing may be able to operate under greater axial loads and may be used for longer periods before the thrust bearing needs to be replaced.

The portion of extrudable component having increased resistance may be provided through selection of material properties. For example, the extrudable component may comprise a first material portion and a second material portion, the second portion having increased resistance to extrusion. The second portion may for example comprise an alternative material to the first. The second portion may, for example, comprise a thicker cross-sectional area compared the first portion.

The extrudable component may comprise a gradient of increased resistance to extrusion. For example, this gradient may be provided by increasing relative thickness of the material over axial distance. In some examples, the gradient may be provided through the selection of material properties, for example, the extrudable component may comprise a composite material, where a filler material is provided to gradually increase the extrudable component's resistance to extrusion.

The extrudable components used in the thrust bearings of the present disclosure may comprise any extrudable material suitable for use in a bearing. For example, the extrudable material may comprise a material having at least one of the following properties: a low co-efficient of friction, a high resistance to extrusion, high heat resistance and high chemical resistance. The extrudable bearing material may comprise an extrudable polymer material, for example PTFE, ultrahigh-molecular-weight polyethylene (UHMWPE) polyimides, polysulfones, polyphenylene sulfides.

The extrudable component can be any suitable form, for example the extrudable component could be in the form of monolithic block, for example a PTFE (or other material) ring. The extrudable component may comprise solid particulates, for example a powder. For example, the solid particulates may be powdered PTFE, carbon, graphite, graphene or the like.

The extrudable component may be provided with desired extrusion characteristics by any suitable fabrication process, for example extrusion, moulding, additive manufacturing, and/or the like.

The extrudable component may comprise, for example, a liquid, gel, viscous substance and/or the like. For example, the extrudable component may comprise an oil-based lubricant, such as, but not limited to grease.

The extrudable component may comprise a composite material. For example, the composite material may comprise a polymer and filler mix. The filler may comprise carbon fiber, glass, ceramic, metals, metal alloys, or any suitable material to impart increased rigidity and/or increased resistance to extrusion to the base polymer material. The composite material may comprise a PTFE and carbon fiber mix. The composite material may comprise a PTFE and bronze filler mix. The extrudable bearing component may be provided with any required percentage of filler material. Where a gradient of increased resistance to extrusion is required, the composite extrudable material may be provided with an axially increasing percentage of filler material. This gradient may be formed within a single structure. Alternatively, or additionally, the gradient may be achieved by the provision of multiple extrudable components having a different filler content, and/or different base material properties. For example, multiple machined rings having differing grades of filler may be stacked together.

The composite material may be prepared to provide desired extrusion properties to the material. For example, a second portion of the composite material may comprise a higher density of filler material compared to a first portion, thereby providing the second portion with a greater resistance to extrusion than the second portion. For example, the composite material may be provided with a gradient density of filler material to provide a gradient increased resistance to extrusion.

Where a composite material is used, the composite material may be formed by any appropriate fabrication process, such as for example, moulding processes, additive manufacturing and/or the like.

The thrust bearing may comprise at least one axially arranged reverse bearing stage. The reverse bearing stage may be configured to transmit an applied axial load in a second relative axial direction. The second relative axial direction may be opposite to the first relative axial direction. The reverse bearing stage may comprise an extrudable component. The thrust bearing assembly may comprise a plurality of axially arranged reverse bearing stages formed between the first and second bearing assemblies. The reverse bearing stages may substantially the same as the bearing stages, except that the reverse bearing stages are configured to transmit applied axial load in the second relative axial direction.

At least one bearing stage may comprise a mechanical bearing assembly. The mechanical bearing assembly may form part of the bearing structure. A plurality of bearing stages may further comprise a mechanical bearing assembly. The mechanical bearing assembly or assemblies may comprise any form of mechanical bearing assembly, for example an assembly comprising opposing bearing faces, or races having a rolling body in between. At least one of the first and second load shoulders may define one of the faces, or races, of the mechanical bearing assembly. The mechanical bearing assembly may be any bearing, such as a roller bearing assembly, polycrystalline diamond bearing, a needle bearing, and/or the like. The provision of an extrudable component within each bearing stage where the extrudable components provide for load balancing between the stages, removes the effect of tolerances in the individual mechanical bearings.

The provision of an extrudable component in combination with the mechanical bearing assembly may provide for the extrudable component to reduce the effects of bending on the mechanical bearing assembly, for example accommodating variations in alignment between the first and second load shoulders. This may facilitate a more even axial load distribution across the bearing assembly, reducing wear rates and the likelihood of the bearing seizing up.

In such cases, the extrudable component may not be subject to rotation and as such, may not be subject to frictional forces generated during relative rotation of the first and second bearing assemblies. In this example, the extrudable component may be less resistant to extrusion, for example the extrudable component may comprise any suitable liquid, gel, viscous material, visco-elastic material etc. For example, the extrudable component may comprise an oil-based lubricant, such as grease.

The thrust bearing may be connectable to an object, wherein the thrust bearing is operable to accommodate relative rotation and axial load transmission between the thrust bearing and the connected object.

The object may comprise any object, and it is not intended for the present disclosure to restrict the use of the thrust bearing to any specific application, unless explicitly mentioned otherwise.

The object may comprise a payload which is to be supported by, acted upon and/or operated by the thrust bearing. In some examples where the thrust bearing is used to permit a payload to be supported by a mandrel, the thrust bearing may function as a swivel.

In some examples the object may form part of an apparatus or system. The thrust bearing may be provided separately from, or as part of the same apparatus or system.

The object may comprise at least a portion of a downhole object, apparatus or system, such as a downhole tool, downhole tubing and/or the like. In this example the thrust bearing may be for use downhole, such that the thrust bearing may be defined as a downhole thrust bearing.

The object may comprise a drilling assembly, such that the thrust bearing may be utilised in drilling operations.

The object may include a jarring tool, such as a downhole jarring tool. In some examples the thrust bearing may form part of a jarring tool. The thrust bearing may accommodate axial loads required as part of a jarring operation, for example to seek to dislodge a stuck object (e.g., drill string, BHA etc.), to install an object (e.g., running casing, cementing operations, piling operations etc.), to retrieve an object (e.g., pulling casing, completions etc.) and/or the like.

In an example the thrust bearing may be configured to provide a load limit within the load mechanism of the jarring tool.

The object may include a resonator.

In some examples, the thrust bearing may be used in or with apparatus for the retrieval and/or deployment of equipment, infrastructure and the like from/to a wellbore. In one example the thrust bearing may be used in or with apparatus for removing or pulling casing from a wellbore, for example as part of a decommissioning operation. In this example the bearing assembly (e.g., the bearing housing) may be connectable to a casing spear for providing an anchor or other suitable connection to a casing string.

In some instances, the thrust bearing may be required to accommodate significant axial loads, and as such the thrust bearing may be defined as a high capacity thrust bearing. In this respect the provision of multiple bearing stages with extrudable components to provide for load balancing may contribute to high load capabilities.

An aspect of the present disclosure relates to a method of operating a thrust bearing. The method comprising applying an axial load in a first relative direction to a thrust bearing. The thrust bearing may comprise first and second bearing assemblies rotatable relative to each; a plurality of axially arranged bearing stages formed between the first and second bearing assemblies. Each bearing stage may comprise a first load shoulder provided on the first bearing assembly; a second load shoulder provided on the second bearing assembly; a bearing structure defined between the first and second load shoulders; and an extrudable component forming part of the bearing structure. The method may further comprise transmitting the axial load between respective pairs of first and second load shoulders via the extrudable components of respective bearing structures. The extrudable components may provide for load balancing between each bearing stage.

The method may further comprise extruding a portion of the extrudable component from at least one respective bearing structure while the thrust bearing is under axial load to provide the load balancing between the bearing stages of the thrust bearing.

The extrusion of a portion of the extrudable component may occur during the initial stages of operation of the thrust bearing. For example, prior to applying any relative rotation between the first and second bearing assemblies. The extrusion of the portion of the extrudable component may occur throughout the operation of the thrust bearing, as required to achieve load balancing between the bearing stages.

The method may further comprise each bearing stage being preconfigured to a substantially load balanced configuration by extrusion of the extrudable component from the respective bearing structures.

The method may further comprise providing relative rotation to the first and second bearing assemblies.

An aspect of the present disclosure relates to a method of manufacturing a thrust bearing. The method comprising providing a first and a second bearing assembly for relative rotation with each other; providing a plurality of axially arranged bearing stages between each of the first and second bearing assemblies. Each bearing stage may be provided with a first load shoulder on the first bearing assembly; a second load shoulder on the second bearing assembly; a bearing structure defined between the first and second load shoulders; and an extrudable component forming part of the bearing structure. The extrudable components may be provided for load balancing between each bearing stage.

The method may further comprise applying an axial load in a first relative axial direction between the first and second bearing assemblies, wherein the axial load is transmitted between respective pairs of first and second load shoulders via the extrudable components of respective bearing structures; and extruding a portion of extrudable component from at least one of the respective bearing structures until the axial load substantially balanced between the bearing stages.

An aspect of the present disclosure relates to a thrust bearing comprising a plurality of bearing stages. Each bearing stage may comprise a bearing structure having a mechanical bearing assembly and an extrudable component. The extrudable component is provided for load balancing between the bearing stages.

An aspect of the present disclosure related to a jarring apparatus comprising a thrust bearing according to any other aspect.

It should be recognised that features defined in relation to one aspect may be applied in combination with any other aspect.

BRIEF DESCRIPTION OF THE DRAWINGS

These and other aspects of the present disclosure will now be described, by way of example only, with reference to the accompanying drawings, in which:

FIG. 5 is a longitudinal cross-sectional view of a thrust bearing according to the present disclosure;

FIG. 6 is a longitudinal cross-sectional view of the thrust bearing with additional anti-extrusion features;

FIGS. 9A, 9B and 9C provide isomeric views of the bearing component parts of the thrust bearings of FIG. 7;

FIG. 10 is a longitudinal cross-sectional view of a thrust bearing having rotatably connected bearing stages;

FIGS. 11A-11D show isomeric views of component parts of the thrust bearing of FIG. 10;

FIGS. 13A, 13B, 13C are longitudinal cross-sectional views of a bi-directional thrust bearing according to the present disclosure;

FIG. 18 is a longitudinal cross-sectional view of the thrust bearing of FIG. 17 under axial loading;

FIG. 19 is an enlarged view of area C in FIG. 18;

FIGS. 23 and 24 provide diagrammatic operational sequences of a jarring apparatus which may comprise a thrust bearing according to the present disclosure.

DETAILED DESCRIPTION OF THE DRAWINGS

The present disclosure relates to a thrust bearing which may be utilised in any number of applications. In the description that follows example forms of thrust bearings are presented, without any intended restriction on a specific application or use, although some examples will be suggested, and one specific example use of a thrust bearing in combination with a jarring tool will be provided.

Figure 1:
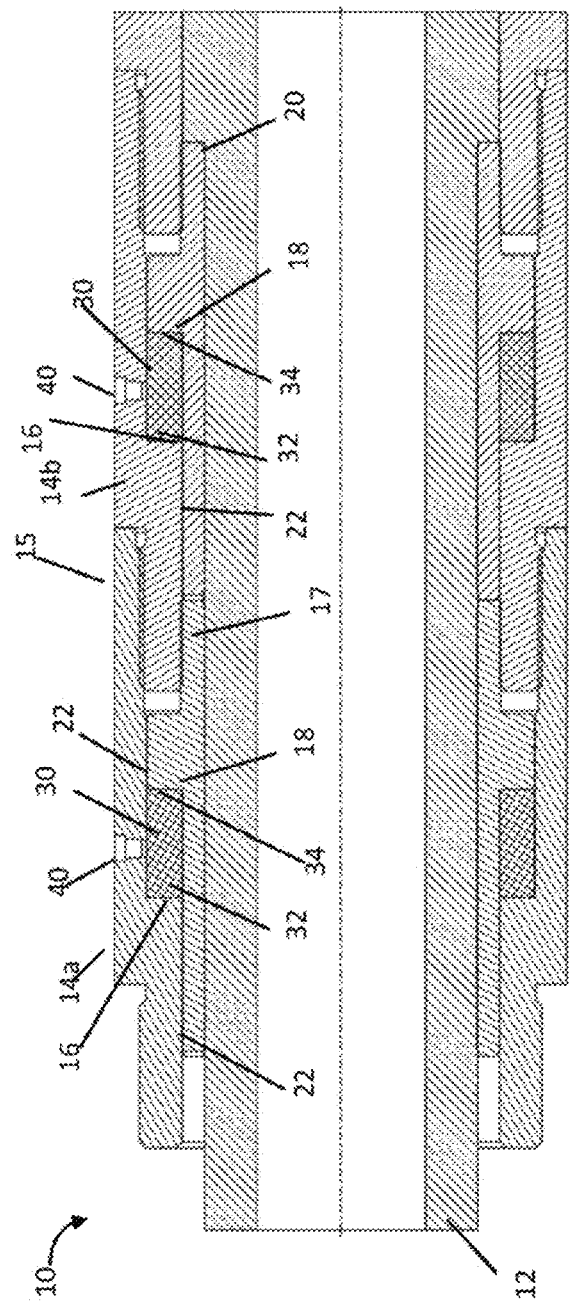
FIG. 1 is a longitudinal cross-sectional view of a thrust bearing according to the present disclosure.

FIG. 1 is a longitudinal cross-sectional view of a thrust bearing 10 having a first bearing assembly 15 and a second bearing assembly 17. In this example, the thrust bearing is mounted on an inner mandrel 12. The first bearing assembly 15 and the second bearing assembly 17 are axially and rotatably moveable relative to each other and are arranged such that the thrust bearing 10 comprises a plurality of bearing stages 14a and 14b. The thrust bearing 10 may be defined as a stacked bearing. In FIG. 1, two bearing stages are shown; however, it will be appreciated that any number of bearing stages may be present to provide a desired bearing capability. Each bearing stage 14a, 14b includes a first load shoulder 16 and a second load shoulder 18 which is positioned radially between the mandrel 12 and the first load shoulder 16. The first and second load shoulders may define a cavity there between. A bearing structure is defined between the first load shoulder 16 and the second load shoulder 18.

The thrust bearing 10 may be of modular construction wherein each bearing stage 14a, 14b can be connected to one another. The first load shoulders 16 and second load shoulders of each bearing stage 14a, 14b may be interengagable with respective parts of an adjacent bearing stage 14a, 14b forming the first bearing assembly 15 and the second bearing assembly 17, respectively. For example, the plurality of bearing stages may be provided with rotary connections to provide for relative rotation between each bearing stage. Alternatively, the plurality of bearing stages may be provided with non-rotary connections such that the bearing stages are rotationally locked relative to each other. Alternatively, the plurality of bearing stages may be integrally formed as single bearing component.

While the thrust bearing 10 may be used in multiple applications, in one example, the thrust bearing may be for use downhole. For example, in a wellbore associated with the exploration and recovery of hydrocarbons. In this case, the thrust bearing may define an outer diameter which permits suitable downhole deployment and operation.

The mandrel 12 may be coupled to or form part of a string, such as a tubing string (e.g. drill string). In one example the tubing string may function to apply an axial force and rotary drive to the mandrel 12. An axial load shoulder 20 is provided on the mandrel 12 to engage with the thrust bearing 10 and apply the axial force to the thrust bearing 10. The thrust bearing 10 may be coupled to an object, such that the thrust bearing 10 may be operable to accommodate relative rotation and axial load transmission between the mandrel 12 and the connected object. The object may comprise any object, and it is not intended for the present disclosure to restrict the use of the thrust bearing 10 to any specific application. In some examples the object may comprise a payload, an apparatus or system, such as a downhole apparatus or system, a downhole tool, downhole tubing, a drilling assembly, a jarring tool, a resonator, a casing spear, a Bottom Hole Assembly (BHA) and/or the like.

Each bearing stage 14a, 14b comprises a bearing structure 30 defined between the first 16 and second load shoulders 18. The bearing structure 30 is provided an extrudable component 32, wherein the extrudable component 32 is provided to allow for load balancing between the bearing stages 14a, 14b. Each bearing stage is configured such that a bearing interface 34 is formed between the extrudable component 32 and the second load shoulder 18. For example, as shown in FIG. 1, when engaged with the mandrel 12, relative rotation between the mandrel and the second bearing assembly results in a bearing interface 34 between the second load shoulder 18 and the extrudable component 32 within the bearing structure 30. It will be appreciated that, the bearing interface could be formed between the first load shoulder 16 and the extrudable component 32, or could be formed between both the load shoulders 16, 18 and the extrudable component 32. In this regard, the extrudable component 32 may also be defined as an extrudable bearing component.

Each bearing stage 14a, 14b is provided with a port 40 to allow for extrusion of the extrudable component 32 during manufacture and/or during use of the thrust bearing to achieve load balancing between the bearing stages 14a, 14b. The ports 40 may be located axially offset from the bearing interfaces 34 in order to minimise the risk of further extrusion through the ports during use of the thrust bearing 10. Positioning the ports 40 offset from the bearing interface may also reduce the likelihood of the interface being deformed by extrusion during the balancing process.

Extrusion gaps 22 will be present between the bearing component parts of the thrust bearing 10. The extrusion gaps 22 may be defined as any possible locations within the thrust bearing 10, where, during use of the thrust bearing 10, extrudable component 32 may be extruded. Example extrusion gaps 22 are located between the first load shoulder 16 and the second load shoulder 18 of a bearing stage 14a, 14b, and between first load shoulders 16 and second load shoulders 18 of adjacent bearing stages.

The extrudable bearing components used in the thrust bearings of the present disclosure may be comprise any extrudable material suitable for use in a bearing. For example, the extrudable bearing component 32 may comprise a material having at least one of the following properties: a low co-efficient of friction, a high resistance to extrusion, high heat resistance and high chemical resistance. The extrudable bearing component 32 may be an extrudable polymer material, for example PTFE, ultrahigh-molecular-weight polyethylene (UHMWPE), polyimides, polysulfones, polyphenylene sulfides. In the present example, the extrudable bearing component 32 is PTFE. The extrudable component 32 can be any suitable form, for example the extrudable bearing component could be in the form of monolithic block, for example a PTFE (or other material) ring, or solid particulars such as a powder.

The thrust bearing 10 may be preconfigured so each bearing stage 14a, 14b is balanced prior to use by extruding a portion of the extrudable bearing component 32 from each of the bearing structures 30. The process to obtain the balanced bearing stages is outlined in FIGS. 2A, 2B and 2C. This process could also represent the initial stages of use of the thrust bearing 10.

Figure 2A:
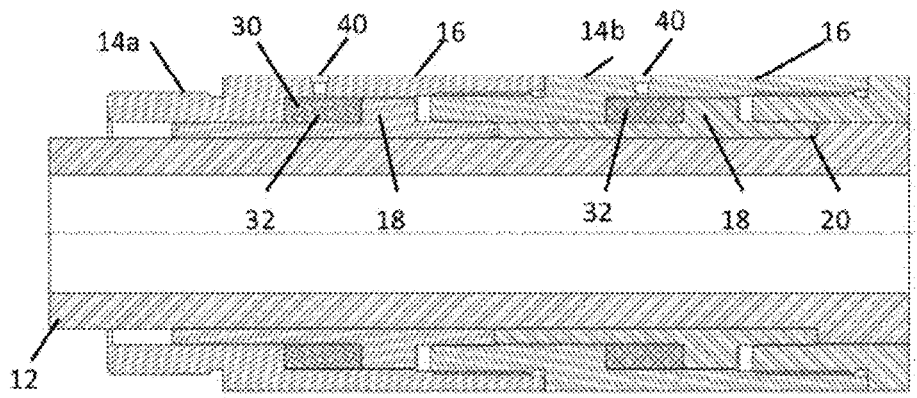
FIGS. 2A, 2B and 2C illustrate an example process for manufacturing a thrust bearing according to the present disclosure.

The thrust bearing 10 is in an initial configuration in FIG. 2A. Mandrel 12 is axially movable relative to the thrust bearing 10. As shown in FIG. 2A, the axial load shoulder 20 is in contact with the second load shoulder 18 of bearing stage 14b such that an axial load can be applied to the thrust bearing via the mandrel 12. Alternatively, the thrust bearing 10 could be arranged such that the axial load is applied via the first load shoulder of at least one stage of the thrust bearing.

In this initial configuration, there will be some engineering tolerances between the bearing component parts of the thrust bearing 10, for example between adjacent bearing stages 14a, 14b. This may result in each bearing stage 14a, 14b of the thrust bearing 10 being subject to an uneven load during use, which could in turn result in uneven wear rates and/or failure of a stage or stages of the thrust bearing 10.

Figure 2B:
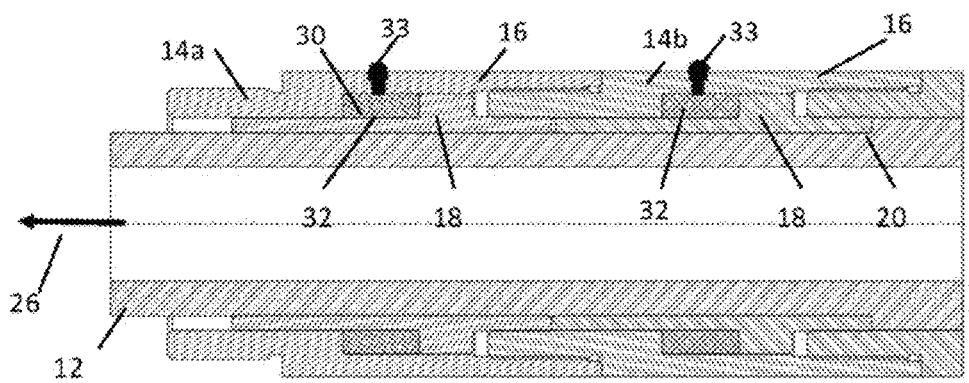

A significant axial load is then applied to the mandrel 12 by pulling the mandrel in the axial direction shown by arrow 26 in FIG. 2B. This axial load is applied to the thrust bearing 10 via the second load shoulders 18 of the second bearing assembly, with the second bearing assembly being axially fixed relative to the mandrel. Although, one will appreciate that application of an axial load to the thrust bearing 10 in the opposite direction via the first load shoulder 16, with the first bearing assembly 16 axially fixed relative to the mandrel 12 would also achieve the same end. In some instances, the thrust bearing 10 may also be subject to heating while under axial load. This may further facilitate extrusion of bearing component 32 from the bearing structures 30.

While the thrust bearing 10 is under the applied axial load, the extrudable bearing component 32 provided within the bearing structures 30 will be compressed by the second load shoulder 18, and bearing material 33 will be extruded through respective ports 40. The bearing stages 14a, 14b will be in a substantially balanced configuration when a degree of extrusion of material occurs from each port 40 of the bearing stage. Once the bearing stages 14a, 14b are determined to be substantially balanced, each port 40 may be closed, for example with a plug 44, to prevent further extrusion from the port 40. Such a determination of the chambers being balanced may be achieved by noting that a degree of material extrusion has occurred from each bearing structure. In this respect the volume of material extruded via each port 40 may be irrelevant. That is, the presence of extrusion from each bearing structure 30 should confirm that each bearing stage is indeed under an even load, particularly where each bearing structure contains an extrudable bearing component 32 of the same material.

Figure 2C:
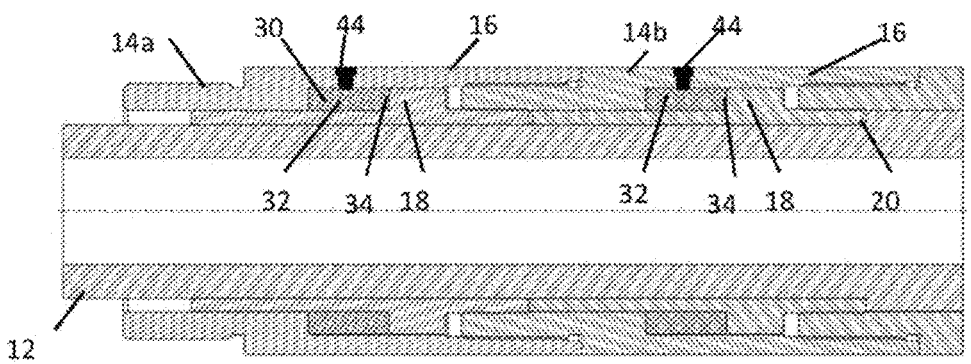

The thrust bearing 10 in FIG. 2C having substantially balanced bearing stages 14a and 14b will reduce, or negate the effect of any tolerances between the bearing component parts of the thrust bearing 10. In use, any applied axial load will be distributed evenly across the stages of the thrust bearing 10. This will prolong the useful life of the thrust bearing and contribute to reduced failure rates.

The load balanced configuration may also be achieved during initial operation of the thrust bearing 10, for example by permitting a degree of extrusion from each bearing structure 30 whilst the bearing 10 in under axial loading for use. In this case, the thrust bearing 10 could be run in hole without pre-loading and the axial load (for example, as shown in FIG. 2B) is applied to the thrust bearing once in position for use. Ports 40 may remain unplugged to allow for self-regulation of load distribution between each bearing assembly by extrusion of the extrudable bearing components 32 under the applied axial load, for example while downhole.

The load balanced configuration may be achieved during continued operation in which equilibrium between the bearing stages 14*a*, 14*b* is continuously sought. That is, any load imbalance between the bearing stages 14*a*, 14*b* may be readily addressed by applying a higher load to one bearing stage causing disproportionate extrusion of the extrudable component 32 within this stage, until the balanced condition is achieved. In this regard, the thrust bearing 10 may be defined as a self-adjusting, or self-balancing multi-stage bearing.

Figure 3:
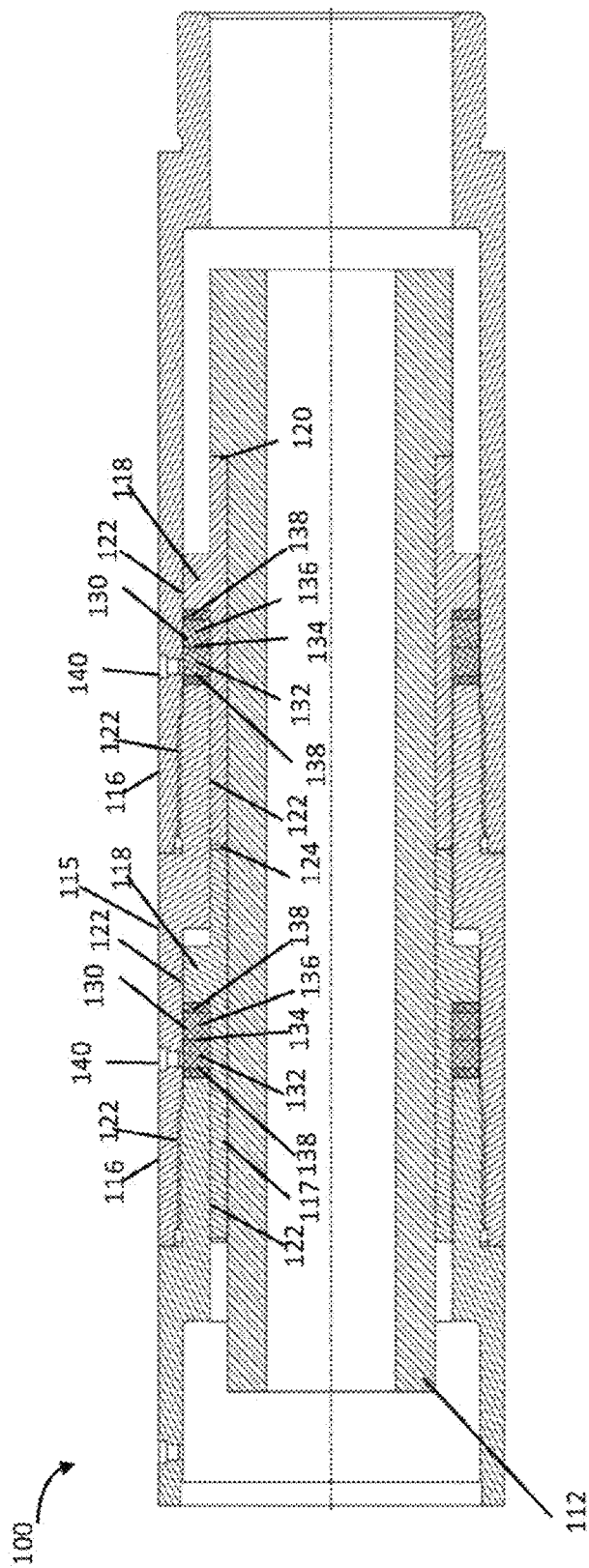
FIG. 3 is a longitudinal cross-sectional view of a thrust bearing according to the present disclosure.

Another example thrust bearing 100 is shown in FIG. 3. Unless otherwise specified the features of the thrust bearing 100 which are the same as the previous example are denoted with the like reference numerals incremented by 100 and are not described again for brevity. The thrust bearing 100 is largely identical to that of FIGS. 1 and 2A to 2C except that each bearing structure 130 contains two extrudable bearing components: a first extrudable bearing component 132 and a second extrudable bearing component 136. The bearing interfaces 134 of the thrust bearing are formed between the first and second extrudable bearing components within each bearing structure 130 of each bearing stage 114*a*, 114*b*. The thrust bearing 100 can be pre-configured to have balanced load balancing chambers 130 via extrusion of material from the load balancing chambers according the same process outlined above. The balancing process may comprise extrusion of one of, or both the first and second extrudable bearing components. Also as outlined above, the thrust bearing 100 may be configured for self-adjusting to achieve load balancing between the bearing stages 114*a*, 114*b* by allowing for extrusion of the extrudable bearing components 132, 136 when the thrust bearing 100 is under an applied axial load during use of the thrust bearing 100.

Figure 4:
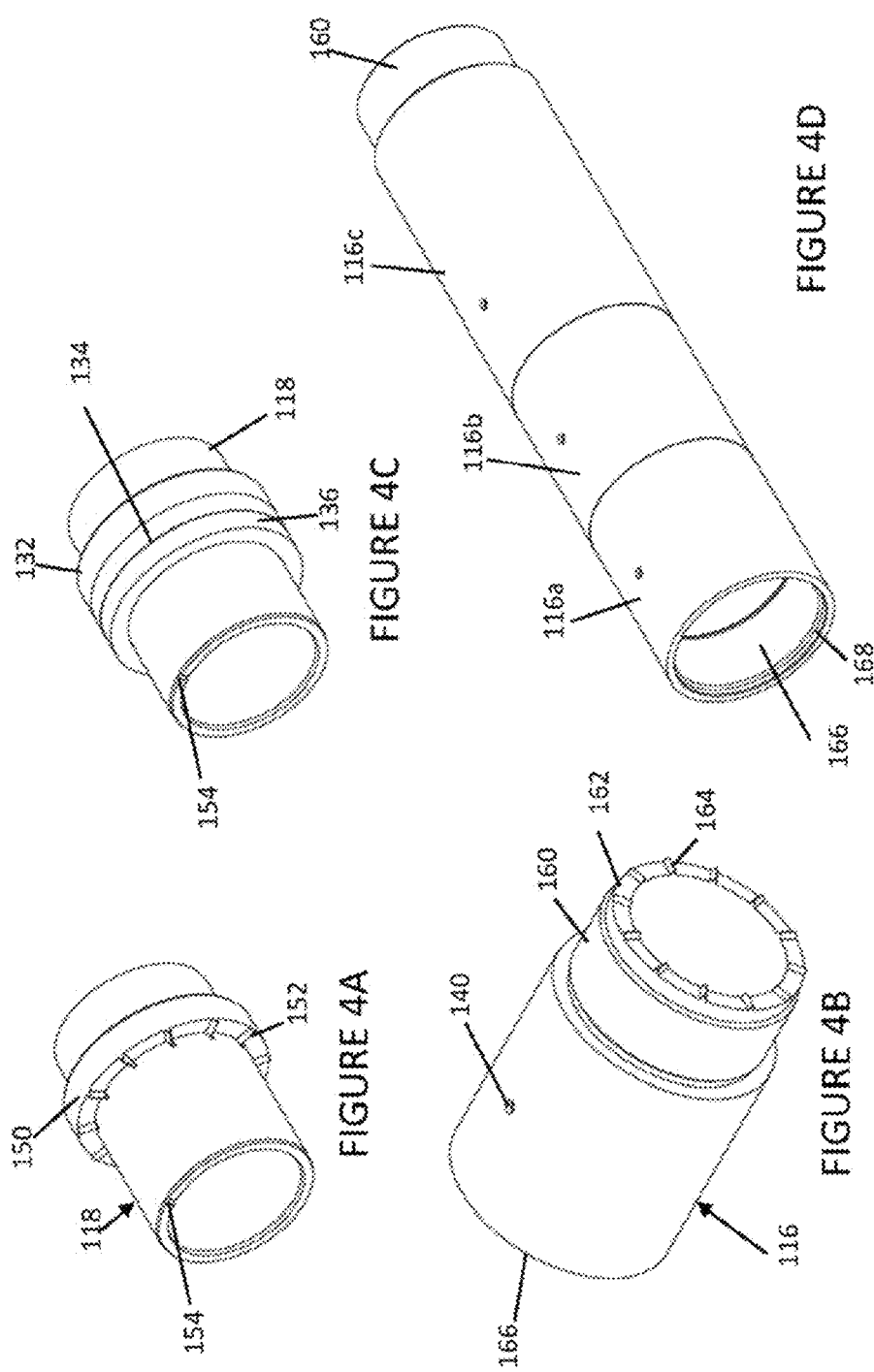
FIGS. 4A-C provide isomeric views of the bearing component parts of the thrust bearing of FIG. 3.
FIG. 4D is an isometric view of the thrust bearing of FIG. 3.

The thrust bearing 100 may be of modular construction and includes multiple connected bearing components. Isomeric views of some of the bearing component parts are shown in FIGS. 4A-C. Each bearing stage 114 comprises a first load shoulder 116 and a second load shoulder 118. The first load shoulder 116 and the second load shoulder 118 may be interengagable to define the bearing structure 130 inbetween.

A second load shoulder 118 is shown in FIG. 4A. The second load shoulder 118 may be provided with an annular rib 150 having teeth 152 for engaging an extrudable bearing component. The second load shoulder 118 may be provided with a slot 154, such that when the thrust bearing 100 is assembled, there is a small gap 124 between adjacent second load shoulders 118. This can help to prevent hydraulic locking from occurring when the second load shoulder 118 is subject to axial load.

A first load shoulder 116 is shown in FIG. 4B. The first load shoulder 116 comprises male 160, and female 166 end portions. The male 160 and female 166 end portions can be threaded 168 to facilitate the joining of modules. The first load shoulder 116 also comprises an annular rib 162 having teeth 164 for engaging an extrudable bearing component.

The bearing structures 130 of each bearing stage 14*a*, 14*b* are formed between the first and second load shoulder 116, 118, when assembled together. In this example, two extrudable bearing components 132, 136 are provided. One of the extrudable bearing components 132 is moulded, bonded or otherwise joined to the annular rib 150 of the second load shoulder 118, wherein teeth 152 facilitate rotational locking 138 of the bearing component 132 relative to the second load shoulder 118. The second extrudable bearing component 136 is also moulded, bonded or otherwise joined to first load shoulder 118 and is configured to engage with rib 162 on the first load shoulder 116 when first and second load shoulders are assembled. The teeth 164 provided on the first load shoulder 116 facilitate rotational locking 138 of the second extrudable bearing component 136 relative to the first load shoulder 116. In this way, a bearing interface 134 is provided between the extrudable bearing components 132, 136 within each bearing structure 130.

Providing the bearing interface between the extrudable bearing components may reduce wear rates, friction heating, lubrication issues and the like resulting from use of the thrust bearing 100. Furthermore, the bearing interface 134 being provided within the bearing structure 130 will mean that the interface is axially removed from potential extrusion gaps 122 around the perimeter of the structure 130. Accordingly, any heat generated at the bearing interface 134 during use of the thrust bearing 100 should dissipate through the extrudable bearing components, minimising the likelihood of further extrusion of the extrudable bearing components 132, 136 whilst the stages are load balanced. The ports 140 provided for extrusion of the extrudable bearing components to pre-configure and balance the bearing stages, in this example, are positioned axially offset from the bearing interface 134 between the two extrudable bearing components so as to minimise the likelihood of the interface 134 being deformed by extrusion during the balancing process.

Multiple first load shoulders 116*a*, 116*b*, and 116*c* may be assembled with the second load shoulders (FIG. 4D) via the complementary female 166 and male 160 end portions to form the thrust bearing 100.

In use, the thrust bearing 100 may be subject to axial load via the mandrel 112 in a first relative axial direction at the contact point between the axial load shoulder 120 and a second load shoulder 118. This applied load will be transmitted between respective pairs of first and second load shoulders 116, 118 via extrudable components 132, 136 and will be evenly distributed across the bearing stages 114*a*, 114*b* by virtue of the extrudable bearing components 132, 136. Bearing stages 114*a*, 114 may be pre-configured to be load balanced by extrusion of the extrudable bearing components within each bearing structure 130 prior to use of the bearing. Or the thrust bearing 100 may permit the bearing stages to become load balanced while in under axial loading in use. Rotation may be imparted via the mandrel to second bearing assembly, causing relative rotation between the second bearing assembly 117 and the first bearing assembly 115.

In another example according to the present disclosure, thrust bearing 200 is provided with axially longer bearing structures 230 as shown in FIG. 5. In this example, unless otherwise specified the features of the thrust bearing 200 which are the same as the previous examples are denoted with the like reference numerals incremented by 200 and are not described again for brevity.

The thrust bearing 200 having bearing stages 214*a*, 214*b*, may be assembled, with the bearing structures 230 being formed between the first load shoulder 216 and second load shoulder 218 in the same manner as discussed above with reference to FIGS. 4A-D. In the example of FIG. 5, two extrudable bearing components are provided within each bearing structure 230. The first extrudable bearing component 232 and the second extrudable bearing component 236 are rotationally locked 238 relative the first load shoulder 216 and the second load shoulder 218 respectively. Increasing the axial length of the bearing structure 230 provides for an increased axial length of extrudable bearing component. Accordingly, the axial distance between the bearing interface 234 and possible extrusion gaps 222 (such as the port 240 and the joins between the second load shoulder 218 and first load shoulder 216) is increased. Accordingly, heat generated at the bearing interface 234 will dissipate through the axial length of the extrudable bearing components 232, 236 providing for cooler, more rigid bearing materials at the extreme ends of the bearing structures, adjacent possible extrusion gaps 222. This may reduce the likelihood of unwanted extrusion through the extrusion gaps 222 while the thrust bearing 200 is in use and in the load balanced condition.

However, the thrust bearing 200 may still allow for extrusion, for example to achieve equilibrium between the bearing stages. For example, any load imbalance between the bearing stages 214a, 214b may be readily addressed by applying a higher load to one bearing stage causing disproportionate extrusion of the extrudable components within this stage, until the load balanced condition is achieved.

In FIG. 6, a further example thrust bearing 300 is shown. The thrust bearing 300 is identical to thrust bearing 200 with additional anti-extrusion devices 370 provided. The anti-extrusion devices 370 may take the form of one or more back-up rings. The anti-extrusion devices can be located at extrusion gaps, for example at the extrusion gap 322 between the first load shoulder 316 and second load shoulder 318 and/or at the extrusion gap 323 between bearing stages. Although six anti-extrusion devices 370 are shown in FIG. 6, it will be appreciated that as many or as little may be used as required by the design specifications of the thrust bearing. The anti-extrusion devices 370 provide a barrier to prevent unwanted extrusion of the first and/or second extrudable bearing component 332, 336 through the interface at which the anti-extrusion device 370 is located. For example, a thrust bearing 300 which is to be load balanced during the initial stages of operation may comprise less anti-extrusion devices than a thrust bearing which has been pre-configured to have load balanced stages prior to use.

Figure 7:
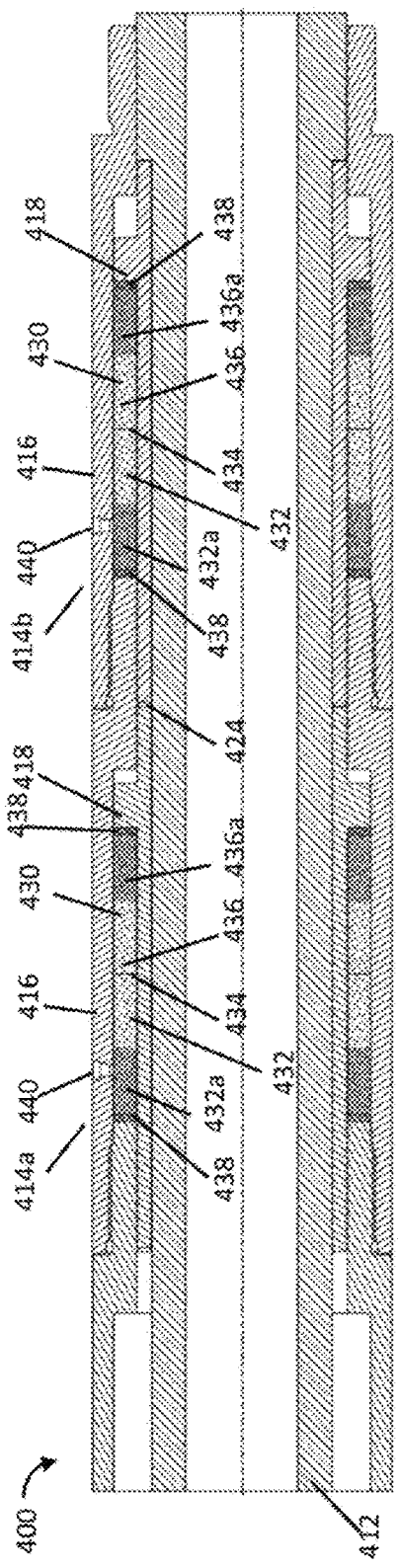
FIG. 7 is a longitudinal cross-sectional view of a thrust bearing having a composite material according to the present disclosure.

In another example according to the present disclosure, illustrated in FIG. 7, thrust bearing 400 is provided. Again, unless otherwise specified the features of the thrust bearing 400 which are the same as the previous examples are denoted with the like reference numerals incremented by a further 100, and are not described again for brevity. Thrust bearing 400 comprises a plurality of bearing stages 414a, 414b, each having a bearing structure 430 containing two composite extrudable bearing components 432, 436, wherein the darker shading 432a, 436b illustrates a higher density of filler material. In this example, the filler is carbon fibre such that the extrudable bearing material is a PTFE-carbon fibre composite. However, the filler material could equally, for example, be glass, ceramic, or any suitable material or combination of materials which increases the bearing materials rigidity and resistance to extrusion.

Figure 8:
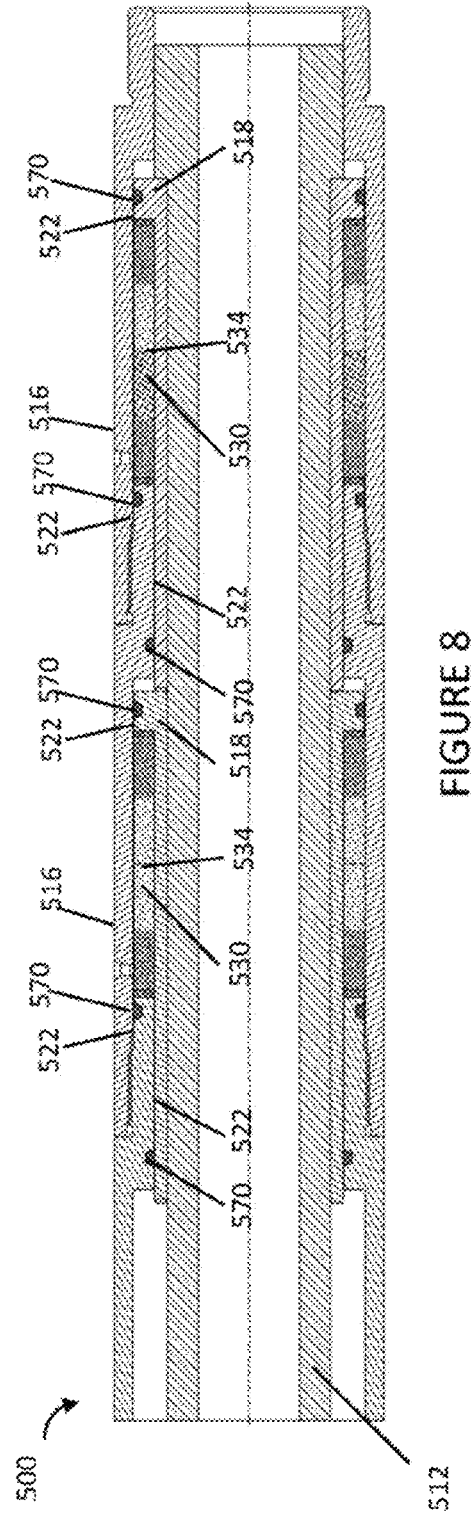
FIG. 8 is a longitudinal cross-sectional view of a thrust bearing having a composite material and additional anti-extrusion features.

Thrust bearing 500 shown in FIG. 8 is identical to thrust bearing 400 with anti-extrusion devices 570. The anti-extrusion devices 570 may take the form of a back-up ring. The anti-extrusion devices can be located at extrusion gaps, for example at the extrusion gap 522 between the first load shoulder 516 and second load shoulder 518 and/or at the extrusion gap 523 between first load shoulders 516 of adjacent bearing stages 514a, 514b. Although six anti-extrusion devices are shown in FIG. 8, it will be appreciated that as many or as little may be used as required by the design specifications of the thrust bearing.

FIGS. 9A to 9C illustrate exploded isometric views of the second load shoulder 418 and first load shoulder 416 of the thrust bearing stage 414a/b. The bearing interface 434 is formed between the first and second extrudable bearing components by moulding, bonding, fusing, integrally forming or otherwise joining the extrudable bearing components 432, 436 to the first load shoulder 416 and second load shoulder 418, respectively. As with previous examples, the second load shoulder 418 may comprise an annular rib 450 having teeth 452 and the first load shoulder 416 may comprise an annular rib 462 having teeth 462 to facilitate rotational locking of the extrudable bearing components relative to the second load shoulder 418 and first load shoulder 416.

With particular reference to FIG. 9B, the portions of the first and second extrudable bearing components having carbon fibres are denoted by reference numbers 432a and 436a, respectively. Although a carbon filler is disclosed in the present example, any other suitable filler may be utilised. Portions 432a, 436a are located axially away from the bearing interface 434. The portions of the extrudable bearing materials having increased resistance to extrusion are therefore located adjacent to, or axially closer to the extrusion gaps.

The first and second extrudable bearing components 432, 436 are less rigid and less resistant to extrusion at the bearing interface 434. This may reduce friction at the bearing interface 434 and facilitate reduced wear rates at the bearing interface 434.

The first and second extrudable bearing components 432 and 436 have an increased resistance to extrusion away from the interface and adjacent extrusion gaps 422, 423 and 440, this will reduce the likelihood of extrusion of material through the extrusion gaps during use of the thrust bearing 400.

Although shown in FIGS. 7, 8 and 9B as distinct portions, the composite extrudable bearing components may be provided with an axial gradient of filler material such that the resistance to extrusion is gradually increased with axially distance from the bearing interface. Whilst a PFTE and carbon fibre mix has been used in the present example, it will be appreciated that any suitable composite extrudable material may be used.

FIG. 10 illustrates a four stage thrust bearing 600 (shown as cross sectional view in the X-Z plane). Each stage 614a-614d of the thrust bearing 600 comprises a first load shoulder 616 and a second load shoulder 618. The first load shoulders 616 are connected by a threaded connection. The second load shoulders 618 are rotatably connected via complementally tabs 666 and slots 662 provided on each second load shoulder 618. Providing a rotatable connection between adjacent second load shoulders 618 may mitigate against issues resulting from variable thermal expansion between the stages of the thrust bearing. For example, should the circumstance arise where one bearing stage is subject to a greater axial load than the other bearing stages, the provision of the rotary connection will ensure that the other bearing stages are at least subject to rotary friction and will experience a degree of thermal expansion.

The thrust bearing 600 may optionally be provided with a pre-load between the bearing stage 614a-614d. As shown in FIG. 10, disc springs 690 are provided between each second load shoulder 618a-618d. Providing a degree of pre-loading between each bearing stage may assist in accommodating thermal expansion between the stages of the thrust bearing 600 during use. The pre-load may act to maintain frictional contact within each bearing stage and thus ensures that each bearing stage 614a-614d will be subject to operational heating while the bearing 600 is under axial loading. Accordingly, the pre-load may ensure that when the thrust bearing 600 is subject to axial loading, each bearing stage 614a-614d will carry a portion of the applied load. The pre-load may, alternatively, be provided within the bearing structure 630 of each bearing assembly.

Upper second load shoulder 618a (shown in FIG. 11A in more detail) comprises slots 662 around the male end 664 provided for inter-engagement with tabs 666 provided on the female end 668 of intermediate second load shoulder 618b. Lower second load shoulder 618d (shown in FIG. 11D) is provided with tabs 666 on its female end 668 only. Disc spring 690 is also provided with slots 692 such that disc spring 690 can also engage with tabs 666 provided on the second load shoulders. Tabs 666 and slots 662 provide for rotational locking between adjacent second load shoulders 618a-618d.

In all of the above described thrust bearings 10, 100, 200, 300, 400, 500 and 600, it will be noted that the plurality of load balancing chambers are not in fluid communication with each other.

Figure 12:
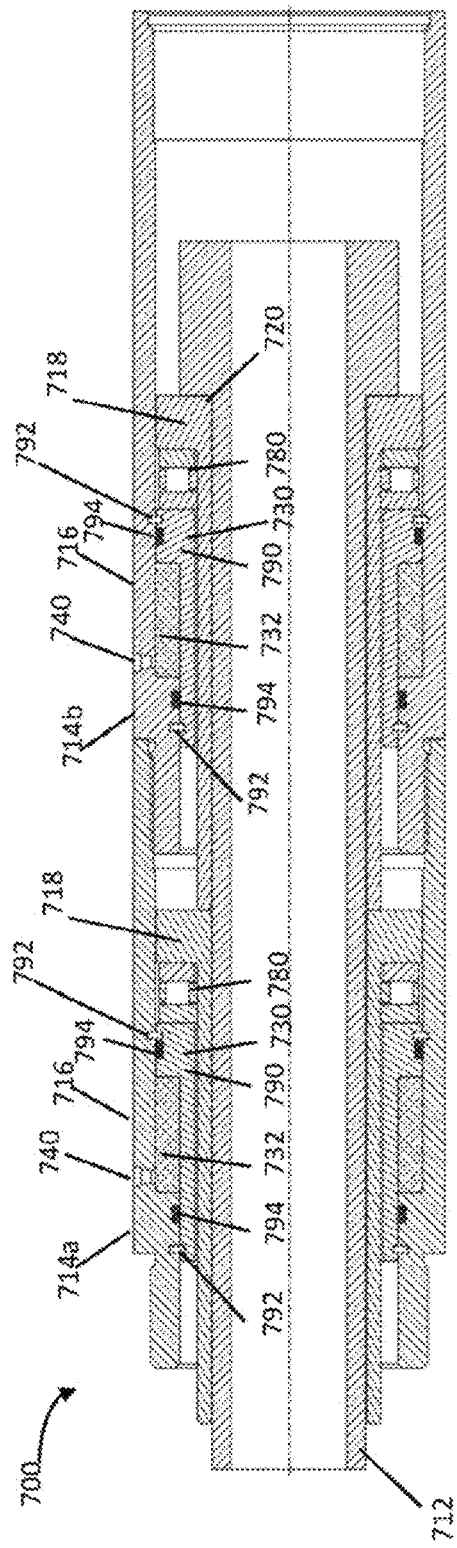
FIG. 12 is a longitudinal cross-sectional view of a combination thrust bearing according to the present disclosure.

FIG. 12 illustrates another example of a thrust bearing 700 according to the present disclosure. Thrust bearing 700 is also a stacked bearing comprising a plurality of bearing stages 714a and 714b having axially distributed bearing structures 730. In this example, the bearing structures 730 are defined between first and second load shoulders 716, 718 and additionally comprise a bearing structure housing 790 which are rotationally locked relative to the first load shoulders 716. The structure housing 790 may be rotationally locked relative to the first load shoulder 716 using at least one complementary lock and key 792 (for example, a keyed or splined connection) provided on the first load shoulder 716 and bearing structure housing 790, respectively. The lock and key 792 is configured to allow for axial movement between the bearing structure housing 790 and the first load shoulder 716. For example, the lock and key 792 may comprise an axial slot to allow for said relative axial movement.

The bearing structures 730 contain extrudable components 732 between the bearing structure housing 790 and the first load shoulder 716. Extrudable components 732 are provided to evenly distribute an applied axial load across the bearing stages 714a, 714b when the thrust bearing 700 is in use. It will be appreciated that alternatively, the bearing structure housing may be rotationally locked relative to the second load shoulder 718.

The thrust bearing 700 is provided with a plurality of axially distributed mechanical bearing assemblies 780, forming part of the bearing structure 730, whereby relative rotation of the first load shoulder 716 and the second load shoulder 718 of each bearing stage 714a, 714b is facilitated by the mechanical bearing assembly 790. The load balancing provided by the extrudable components 732 removes the need for exacting tolerances between the mechanical bearing assemblies. The mechanical bearing assembly or assemblies may comprise any form of mechanical bearing assembly, for example an assembly comprising opposing bearing faces, or races having a rolling body in between. At least one of the first and second load shoulders may define one of the faces, or races, of the mechanical bearing assembly. The mechanical bearing assembly may, for example be a roller bearing assembly The extrudable bearing component 732 contained with bearing structures 730 will not be subject to rotational stress, or friction and therefore, a material with a lower resistance to extrusion may be used if desired. For example, extrudable component 732 may be an oil-based lubricant such as grease. The bearing stages 714a, 714b may be pre-configured to be balanced by extruding the grease from the load balancing chambers through port 740 until an applied axially load is evenly distributed across the bearing stages 714a, 714b, in the same process as described for FIGS. 2A to 2C.

Static seals 794 are provided between the chamber housing 790 and the bearing housing 716 to seal the extrudable bearing component 732 within the load balancing chamber 730.

FIG. 13A shows a further thrust bearing 800 according to the present disclosure. Thrust bearing 800 comprises a plurality of bearing stages 814a-814h mounted on a mandrel 812. The bearing stages 814a-814h are substantially identical to those described in relation to FIGS. 1, 3, 5, 6, 7, 8 and 10 in that each bearing stage 814a-814h comprises a first load shoulder 816, a second load shoulder 818 and a bearing structure 830 therebetween. The bearing structures 830 contain an extrudable bearing component according to any of the previously described extrudable bearing components.

Thrust bearing 800 is a bi-directional stacked bearing. The thrust bearing 800 is provided with a central housing portion 820 with bearing stages 814a-814h positioned either side of the central housing portion 820 such that the thrust bearing 800 is symmetrical around the central housing portion 820. The bearing stages 814d and 814e positioned adjacent the central housing portion 820 comprise axial load shoulders 821 and 823 which are configured to engage with complementary shoulders 811, 813 provided on the mandrel 812. Accordingly, an axial load can be applied centrally in either axial direction to the thrust bearing.

In FIG. 13B, mandrel 812 is pulled in the direction of arrow 817 such that axial load shoulders 811 and 821 are engaged. The axial load is initially applied to bearing stage 814d and will be distributed evenly between bearing stages 814a, 814b, 814c and 814d via the extrudable bearing components as described previously. The bearing stages 814a-814d may be pre-configured to a balanced configured by extrusion of extrudable bearing component from each of the bearing structures 830, or each bearing stage 814a-814d may be balanced during use of the thrust bearing 800 by permitting extrusion, for example through ports 840 during use.

In FIG. 13C, mandrel 812 is pushed in the direction of arrow 819 such that axial load shoulders 813 and 823 are engaged. The axial load in this case is initially applied to bearing stage 814e and the axial load will be distributed evenly between bearing stages 814e, 814f, 814g and 814h by virtue of their extrudable bearing components. The bearing stages 814e-814h may be preconfigured to a balanced configured by extrusion of extrudable bearing component from each of the bearing structures 830, or each bearing stage 814e-814h may be load balanced during use of the thrust bearing assembly 840 by permitting extrusion during use.

In this example, there are four bearing stages on either side of the central housing portion 820, however, it will be appreciated that any number may be provided according to the load requirements of the bearing and that it is not necessary for the thrust bearing to be symmetrical around the central housing portion 820.

Figure 14A:
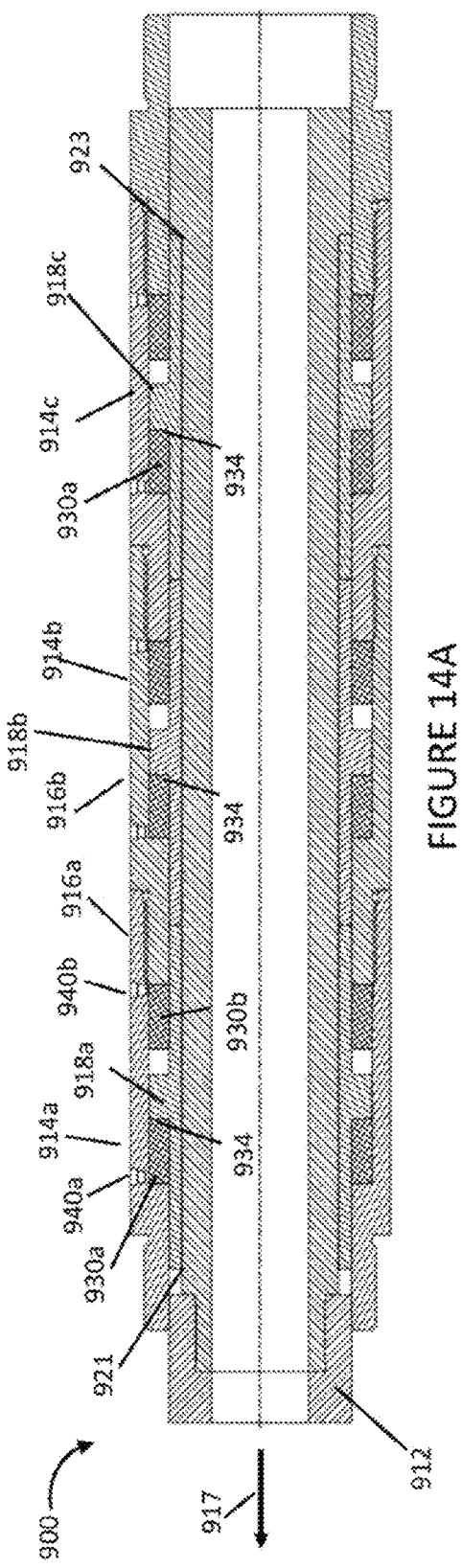
FIGS. 14A and 14B are longitudinal cross-sectional views of an alternative bi-directional thrust bearing according to the present disclosure.
Figure 14B:
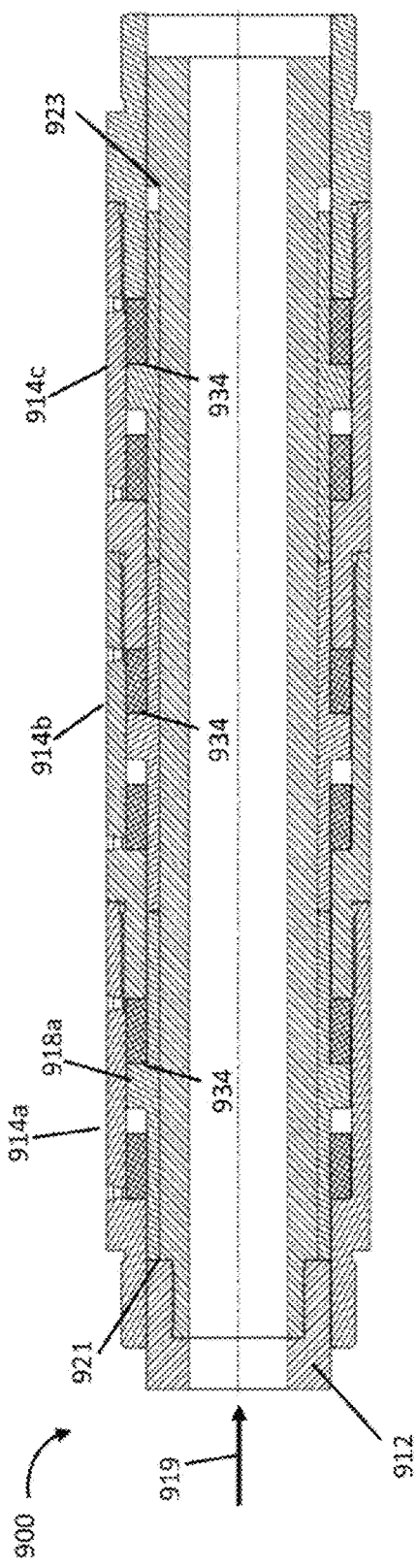

FIGS. 14A and 14B show an alternative bi-directional thrust bearing assembly 900.

Thrust bearing assembly 900 comprises a plurality of axially stacked bearing stages 914a-914c, each bearing assembly comprising first load shoulders 916a-916c, a second load shoulders 918a-918c and an extrudable bearing component 930a. In this example, the thrust bearing 900 is configured for an axial load to be applied at the either distal end of the thrust bearing assembly 900 and axial load shoulders 921 and 923 are provided to engage with a mandrel 912, depending upon the direction of the applied axial load. An additional extrudable bearing component 930b is provided between each bearing stage, the additional extrudable bearing component 930b being located between adjacent second load shoulders 918a, 918b, 918c. Accordingly, each second load shoulder is configured to engage either of the extrudable bearing components 930a or 930b, depending upon the direction of the applied axial load.

In FIG. 14A, an axial load is applied in the direction of arrow 917 such that axial load shoulder 923 engages second load shoulder 918c of bearing stage 914c. Second load shoulders 918a, 918b, and 918c move to engage extrudable bearing component 930a, forming a bearing interface 934. The axial load is substantially evenly distributed between the bearing stages 914a-914c as previously described, by extrusion of the extrudable bearing component 930a through ports 940a whilst the thrust bearing is under the applied axial load (either during use of the thrust bearing and/or prior to use).

In FIG. 14B, an axial load is applied in the direction of arrow 919 such that axial load shoulder 921 engages second load shoulder 918a of bearing stage 914a. Second load shoulders 918a, 918b, and 918c move to engage extrudable bearing component 930b, forming a bearing interface 934. The axial load is substantially evenly distributed between the bearing assemblies 914a-914c by extrusion of the extrudable bearing component 930b through port 940b whilst the thrust bearing is under the applied axial load (either during use of the thrust bearing and/or prior to use).

Figure 15:
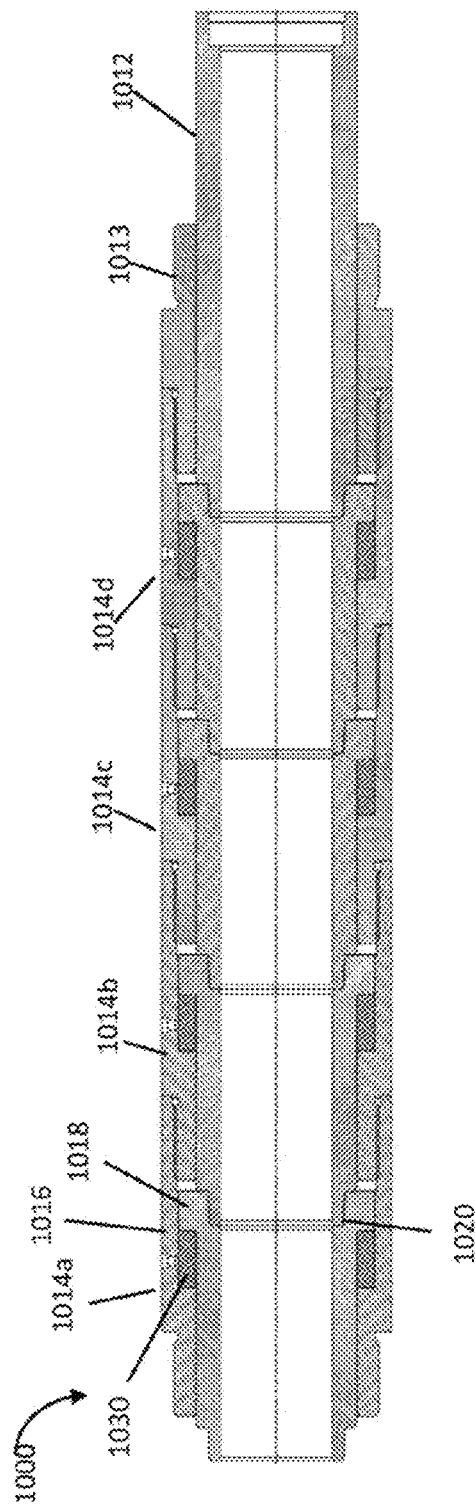
FIG. 15 is a longitudinal cross-sectional view of a thrust bearing according to the present disclosure.

FIG. 15 is a stacked thrust bearing 1000 according to the present disclosure. Similar to other examples, the thrust bearing 1000 comprises a plurality of bearing stages 1014a-1014d, each having a first load shoulder 1016, second load shoulder 1018 and bearing structure 1030 defined therebetween. Each bearing structure 1030 contains an extrudable bearing component which can be any of the previously described extrudable bearing components. In this example, second load shoulders 1018 are provided with female and male end portions 1020 for rotatably connecting adjacent second load shoulders 1018. At a distal end of the thrust bearing 1000 there is provided an end carrier 1012 and end housing 1013. The end carrier 1012 has a female end portion to allow the thrust bearing 1000 to be interconnected to another downhole apparatus. An applied axial load may be substantially evenly distributed between the bearing stages 1014a-1014d in the same manner as described above for the other example thrust bearings.

Figure 16A:
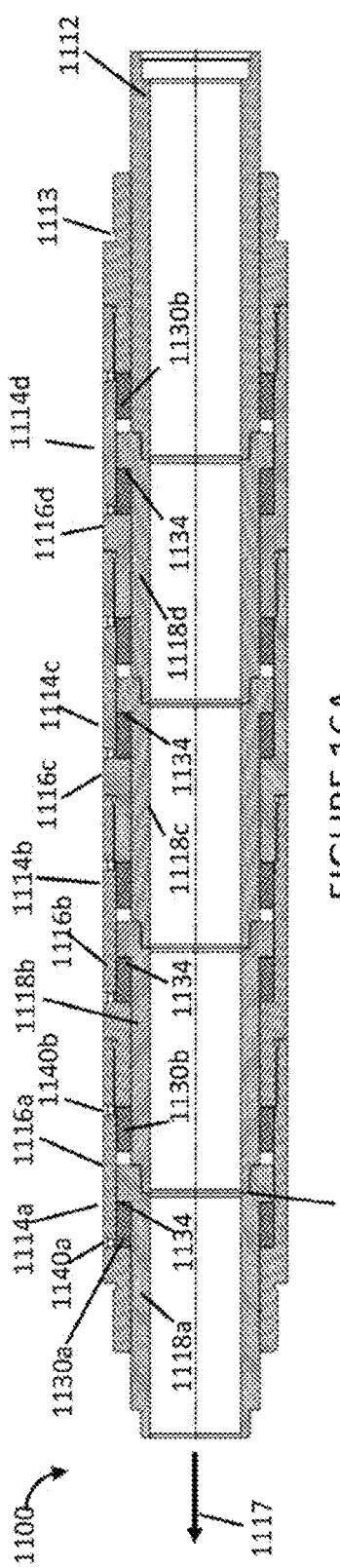
FIGS. 16A and 16B are longitudinal cross-sectional views of a bi-directional thrust bearing according to the present disclosure.
Figure 16B:
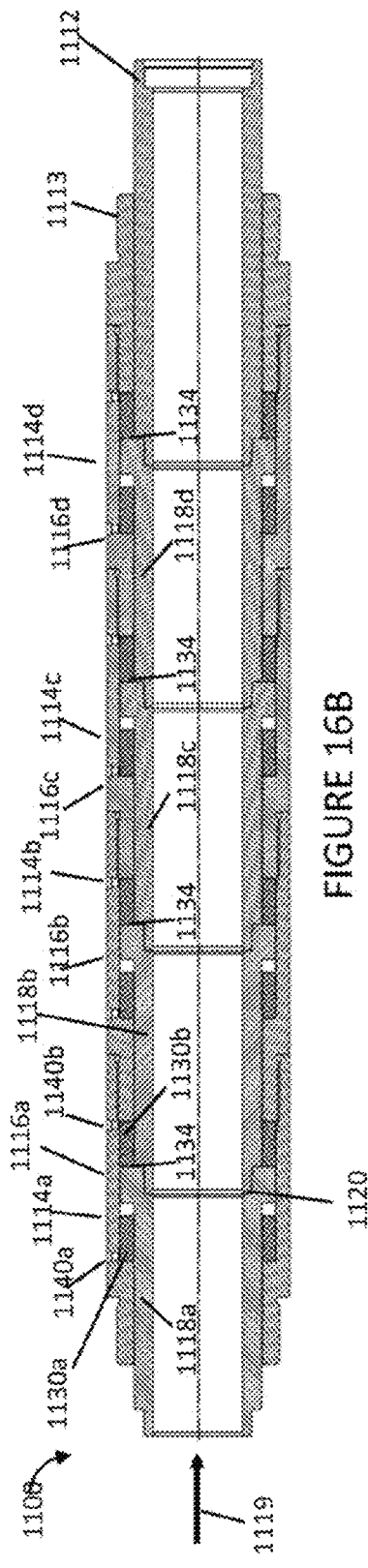

Another bi-directional thrust bearing assembly 1100 is shown in FIGS. 16a and 16b. Thrust bearing 1100 comprises a plurality of axially stacked bearing stages 1114a-1114d, each bearing stage comprising a first load shoulder 1116a-1114d, a second load shoulder 1118a-1118d and an extrudable bearing component 1130a. Similarly to the bearing stages 1014a-1014d, each second load shoulder 1118a-1118d is provided with female and male end portions 1120 for rotatably connecting adjacent second load shoulders 1118 such the second load shoulders 1118a-1118d are interconnected to form a mandrel. At a distal end of the thrust bearing 1100 there is provided an end carrier 1112 and end housing 1113. The end carrier 1112 has a female end portion to allow the thrust bearing 1100 to be interconnected to another downhole apparatus. The second load shoulders 1118a-1118d are axially moveable relative to their respective first load shoulders 1116, and end carrier 1112 is axially movable relative to the end housing 1113, allowing for the application of axial load in either axial direction to the thrust bearing assembly 1100 via the second load shoulders.

The first bearing stage 1114a comprises a single extrudable bearing component 11130a. An additional extrudable bearing component 1130b is provided between subsequent adjacent bearing stages. The additional extrudable bearing component 1130b is provided on second load shoulders 1118b-1118d, and end carrier 1120, and is located between adjacent first load shoulders i.e. between first load shoulders 1116a and 1116b for the bearing stages 1114a and 1114b.

In FIG. 16A, an axial load is applied in the direction of arrow 1117, pulling second load shoulders 1118a-1118d into engagement with extrudable bearing component 1130a, and forming a bearing interface 934. The axial load is substantially evenly distributed between the bearing assemblies 1114a-1114c by extrusion of the extrudable bearing component 1130a whilst the thrust bearing 1100 is under the applied axial load (either during use of the thrust bearing and/or prior to use as described previously).

In FIG. 16B, an axial load is applied in the direction of arrow 1119, and second load shoulders 1118a-111d move to engage extrudable bearing components 11130b, forming a bearing interface 1134. The axial load is substantially evenly distributed between the bearing stages 1114a-1114c by extrusion of the extrudable bearing component 1130b.

Figure 17:
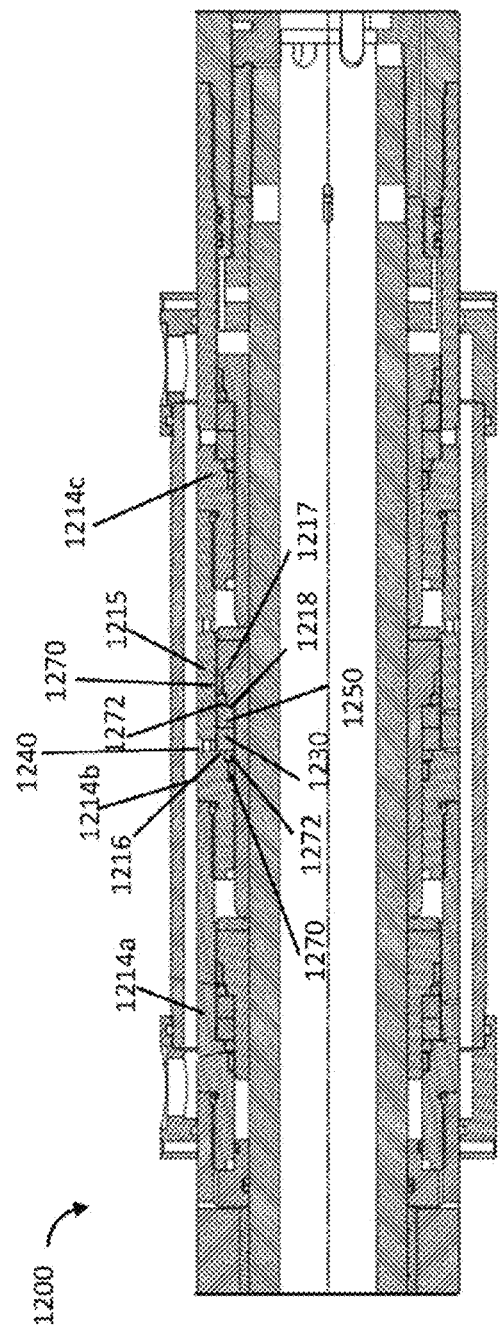
FIG. 17 is a longitudinal cross-sectional view of a thrust bearing according to the present disclosure.

FIGS. 17, 18 and 19 show a thrust bearing 1200 according to the present disclosure having alternative anti-extrusion assemblies. Thrust bearing 1200 comprises first and second relatively rotatable bearing assemblies 1215, 1217 and a plurality of bearing stages 1214a, 1214b, 1214c. Similar to previous examples, each bearing stage comprises an extrudable component 1230 within a cavity 1250 defined between first and second load shoulders 1216, 1218. In this example, the extrudable component 1230 is shown as comprising two extrudable components having a bearing interface there between, although it will be appreciated that any of the aforementioned extrudable components may be present. The extrudable components 1230 in each stage may permit load balancing between adjacent stages with the bearing 1200 is subject to axial loading.

The thrust bearing 1200 is provided with anti-extrusion assemblies to prevent leakage of the extrudable component 1230 from the bearing, whilst still permitting the bearing to self-adjust to achieve a load balanced configuration. In this example, the anti-extrusion assembly comprises an extrudable anti-extrusion ring 1270 on either side of the cavity 1250, and located to close extrusion gaps between the first and second bearing assemblies 1215, 1217.

A spacer component in the form of a locking ring 1272 is axially interposed between the extrudable components 1230 and each anti-extrusion ring 1270, such that, at least initially, the extrudable components 1230 are separated from the anti-extrusion rings 1270. This may minimise any frictional heating between the extrudable components 1230 and the anti-extrusion rings 1270.

In the present example, each locking ring 1272 comprises a taper lock structure which functions to cause the locking rings 1272 to become locked to a respective one of the first and second bearing assemblies 1215, 1217 when the bearing is axially loaded. Although a tapered locking structure is disclosed this is merely exemplary and other mechanism to achieve rotary locking may be used, such as splines, castellations and/or the like.

When the bearing 1200 is subject to axial loading, as illustrated by arrow 1299 in FIG. 18, the extrudable components 1230 of each bearing stage may begin to extrude or deform within the cavity 1250 in order to accommodate changes in relative spacing between the first and second load shoulders 1216, 1218 and thus balance the applied axial load across the stages.

FIG. 19 is an enlarged view of area C in FIG. 18 and illustrates the operation of the anti-extrusion assembly. The locking ring 1272 acts to maintain the bulk of the extrudable component 1230 within the cavity 1250 while the bearing is under axial loading and subject to rotation. As the applied axial load is transmitted across the stages of the bearing 1200, the relative axial distance between the load shoulders 1216, 1218 will contract reducing the volume of the cavity 1250. The extrudable component 1230 will deform accordingly, with extrudable material 1232 extruding through extrusion gap 1273 between the locking ring 1272 and the extrudable anti-extrusion member 1270. As the loading across the bearing stage increases, the extruded material 1232 will load against the anti-extrusion members 1270, resulting in the eventual extrusion of the anti-extrusion members 1270. Such extrusion of the anti-extrusion members 1270 may thus accommodate further deformation of the extrudable components 1230 to allow load balancing to continue. As such, the anti-extrusion members 1270 may be sacrificial in favour of retaining the material of the extrudable components 1230 within each bearing stage.

The provision of a bearing structure having an extrudable component may allow the bearing to more readily accommodate bending. Therefore, thrust bearings of the present disclosure may advantageously be used in operations where the bearing may be subject to axial misalignment or bending forces, for example but not limited to in deviated well bores. Thrust bearings of the present disclosure may be utilised within downhole swivel subs. Typically thrust bearings, for example mechanical bearings can experience issues when the bearing is subject to non-uniform loading, for example as a consequence of misalignment between rotating components when under bending loads. This can lead to premature bearing failure, binding of the swivel joint and the like.

The extrudable bearing components as described in the examples above can deform to maintain an even axial and rotational load across the bearing.

Figure 20:
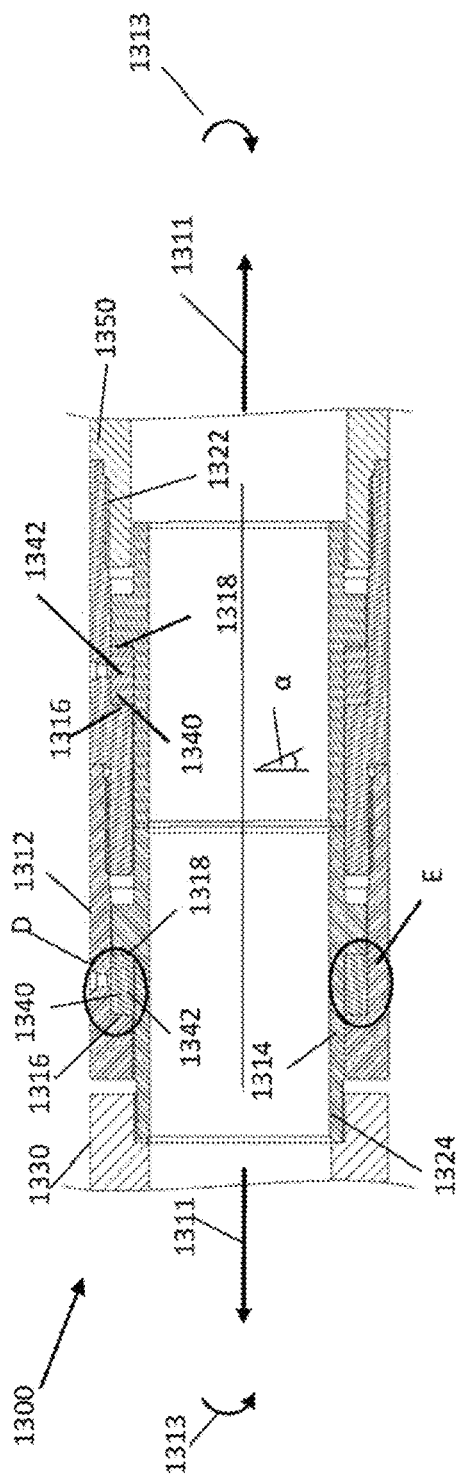
FIG. 20 is an illustrative view of a thrust bearing according to the present disclosure when subject to bending.

FIG. 20 is a longitudinal cross-sectional view of an example thrust bearing, in the form of a multi-stage swivel 1300 according to the present disclosure. Swivel 1300 is shown providing a rotary connection between two objects 1330, 1350 which in the present example are tubular in form, for example as may be deployed in a wellbore environment, although the particular objects being connected or the specific application is in no way limiting. The swivel 1300 may equally be connected to other objects, for example, tools, such as downhole tools, winches, lifting apparatus, mooring systems, tether systems and the like.

The swivel 1300 comprises a first or outer swivel member 1312 and a second or inner swivel member 1314, wherein the swivel members 1312, 1314 are rotatable relative to each other. The first and second swivel members 1312, 1314 include respective connectors 1322, 1324 which facilitate connection with objects 1330, 1350. In the present example, the connectors 1322, 1324 are threaded connectors, although any other connector may be provided.

In the example shown In FIG. 20, the first swivel member 1312 comprises two first load shoulders 1316 and the second swivel member 1314 comprises two second load shoulders 1318, with the first and second swivel members 1312, 1314 arranged such that bearing cavities 1340 are defined between the respective pairs of load shoulders 1316, 1318. It will be appreciated that any number of pairs of load shoulders may be provided depending upon the loading requirements of the swivel.

The swivel 1300 further comprises a deformable bearing component 1342 disposed within each cavity 1340 and engaged with the first and second load shoulders 1316, 1318. In one example, the deformable bearing component 1342 may be in sliding contact with both of the load shoulders 1316, 1318. In another example, the bearing component 1342 may be rotatably fixed to one of the first and second load shoulders 1316, 1318, and in sliding engagement with the other of the first and second load shoulders 1316, 1318.

When the swivel 1300 is under axial loading, illustrated by arrows 1311, this load will be transmitted between the respective load shoulders 1316, 1318 via the deformable bearing components 1342. Furthermore, relative rotation between the first and second swivel members 1312, 1314 may be accommodated via sliding contact between the deformable bearing component 1342 and one or both of the first and second load shoulders 1316, 1318.

Depending on the operational loads involved, extrusion of the deformable bearing component 1342 under load may be a consideration. In this respect any extrusion gaps may be minimised, for example by close running tolerances between the first and second swivel members 1312, 1314, incorporation of anti-extrusion features, such as anti-extrusion rings and the like.

Figure 22:
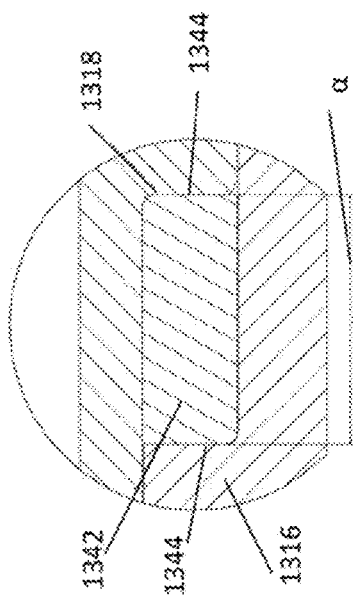
FIGS. 21 and 22 are enlarged views of areas D and E in FIG. 20.
Figure 21:
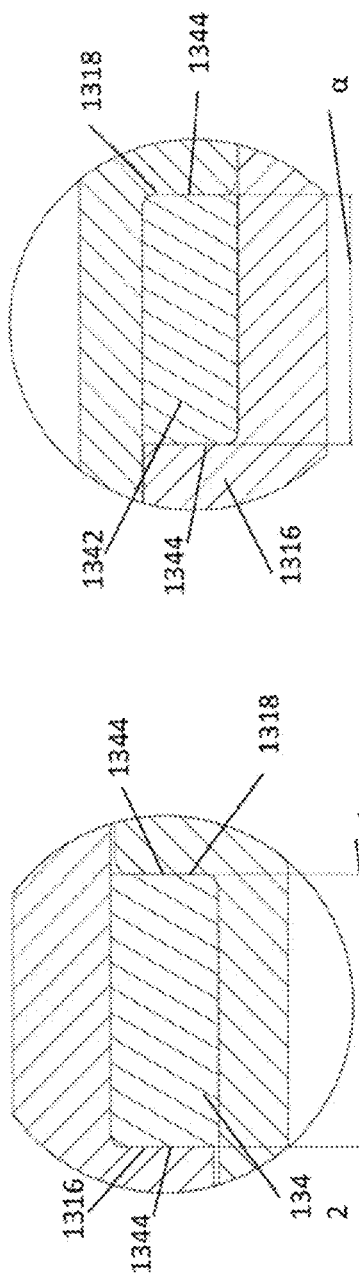

When the swivel 1300 is subject to bending as illustrated by arrows 1313, for example due to the application of a non-axial external load, or arising from misalignment between the objects to which it is connected (tubulars 1330, 1350 in this example), a bend angle α may arise, such that the geometry of the cavity 1340 between the first and second load shoulders 1316, 1318 is changed and the load shoulders are subject to off axis misalignment. However, by virtue of its deformable and thus compliant nature, the bearing component 1342 will maintain conformance to the geometry of the cavity 1340, and thus enable continuous and full circumferential contact between the bearing component 1342 and the load shoulders 1316, 1318. This continuous contact is illustrated in FIG. 21 which is an enlarged view of region D of FIG. 20, and FIG. 22 which is an enlarged view of region E of FIG. 20. As such, a continuous bearing interface 1344 is maintained between the bearing component 1342 and the load shoulders 1316, 1318, despite the bend angle α. This may thus facilitate the applied axial load 1311 to be applied move evenly across the deformable bearing component 1342 under bending conditions, improving reliability, wear rates and the like.

As noted above, thrust bearings according to the present disclosure may be utilised in any number of applications. However, there follows an example of a jarring apparatus in which a thrust bearing according to the present disclosure may be used.

A jarring apparatus, generally identified by reference numeral 1400, is diagrammatically illustrated in cross-section in FIG. 23. The jarring apparatus 1400, which is only partially shown in FIG. 23, is illustrated in a non-jarring configuration and is sized and arranged to be deployed into a wellbore. Although not shown, the jarring apparatus 1400 may be deployed into a wellbore on wireline, tubing, such as coiled tubing, jointed pipe or the like.

The jarring apparatus 1400 comprises a first jarring assembly in the form of a mandrel 1412, and a second jarring assembly in the form of an outer housing assembly 1414. The jarring apparatus 1400 is configured such that relative rotation established between the mandrel 1412 and outer housing assembly 1414 causes reciprocating motion of a jarring mass 1424 to generate repeated linear jarring forces. In this regard, as jarring is achieved through relative rotation, the apparatus 1400 may be defined as a rotary jarring apparatus. In use, the outer housing assembly 1414 may be engaged with an object (not shown), such as a stuck object within a wellbore, with the mandrel 1412 rotated via a suitable rotary drive, such as a motor, rotatable work string or the like, thus applying the generated jarring forces to the object.

In the present example the jarring apparatus 1200 is arranged to provide axial jarring forces in the direction of arrow 1416, which may be defined as an uphole direction. In use, an axial pulling force may be applied to the mandrel 1412 in the direction of arrow 1416 during the jarring operation, and a load/resistance applied to the housing 1414 in the direction of arrow 1417, such as from a stuck object, suspended load etc. Such loading through the apparatus 1400 may contribute to the generation of a jarring force. However, in the present example the jarring apparatus 1400 incorporates features to provide a degree of protection from excessive loading or overloading.

The apparatus 1400 comprises a thrust bearing 1410, which in the present example is illustrated in a simplified format, for clarity purposes. However, the thrust bearing 1410 may be provided in accordance with any of the example thrust bearings described above. The simplified thrust bearing 1410 includes a first thrust shoulder 1420 provided on the mandrel 1412, and a second thrust shoulder 1428 provided on the housing 1414. In this respect the first thrust shoulder may be equivalent to the load shoulder 20 and the second thrust shoulder 1428 may be equivalent to the second load shoulder 18, 118, 218, 318 etc. of the previously described thrust bearings. The plurality of axially bearing stages comprising bearing structures as described above are illustrated in a simplified format by 1450.

In the configuration shown in FIG. 17 the first and second thrust shoulders 1420, 1428 are axially separated and thus disengaged. However, as will be described in more detail below, relative axial movement between the mandrel 1412 and housing 1414 (in the relative direction of arrows 1416, 1417) will eventually bring the first and second thrust shoulders 1420, 1428 into engagement, such that axial loading may be transmitted between the mandrel 1412 and housing 1414 via the thrust bearing 1410, thus diverting such loading from other bearing components within the apparatus 1400. In this respect the thrust bearing 1410 may function as or define a load limiter. The thrust bearing 1410 permits rotation between the first and second thrust shoulders 1420, 1428 when engaged, thus providing a rotary bearing function.

The jarring mass 1424 is radially positioned between the mandrel 1412 and housing 1414, and is axially moveable in reverse directions (directions 1416, 1417) relative to both the mandrel 1412 and housing 1414. The jarring mass 1424 is rotatably fixed relative to the mandrel 1412 via a rotary connection, such as a keyed or splined connection. However, in other examples the jarring mass may alternatively be rotatably fixed relative to the housing 1414.

The jarring mass 1424 includes a first impact surface 1430, and the housing 1414 includes a second impact surface 1432, wherein, in use, reciprocating axial movement of the jarring mass 1424 causes the first and second impact surfaces 1430, 1432 to axially impact together, thus generating repeated axial jarring forces within the apparatus 1400. In an alternative example the mandrel 1412 may comprise an axial impact surface, alternative or in addition to the impact surface provided on the housing 1414. As the jarring mass 1424 is responsible for generating impact within the apparatus 1200, the jarring mass may thus also be defined as a hammer.

A force mechanism 1434 in the form of a power spring (e.g., a Bellville spring stack) is provided within the apparatus 1400, and is configured, in use, to bias the jarring mass 1424 to move axially in the direction of arrow 1416, and thus to bias the first and second impact surfaces 1430, 1432 into engagement. As will be described in more detail below, relative movement between the mandrel 1412 and housing 1414 in the direction of arrows 1416, 1417, will cause the spring 1434 to be engaged and compressed by an annular shoulder 1436 on the mandrel 1412. In this respect, the force generated by the spring 1434 against the jarring mass 1424 is a function of the compression or displacement of the spring 1434. In some examples the spring 1434 may be uncompressed until engaged by the mandrel. However, in other examples the spring may carry a degree of pre-compression.

The jarring apparatus 1400 further includes a lifting assembly 1412 which is operable by relative rotation between the mandrel 1312 and housing 1314 to cyclically lift the jarring mass 1324 in the direction of arrow 1317 against the bias of the spring 1434, and release the lifted jarring mass 1424 to permit the jarring mass to be driven by the spring 1434 in the direction of arrow 1416, causing the impact surfaces 1430, 1432 to rapidly engage to establish a jarring force. Any suitable form of lifting assembly 1438 may be provided to function to cyclically lift and release the jarring mass 1424 in the manner described.

In the present example the lifting assembly 1438 includes a first lifting structure 1440 rotatably and axially fixed relative to the housing 1414, and a second lifting structure 1442 rotatably fixed, but axially moveable, relative to the mandrel 1412. In the present example the second lifting structure 1442 is integrally formed with the jarring mass 1424, and is thus rotatably connected to the mandrel 1412 via rotatable connection. In other examples the second lifting structure 1442 may be separately formed and rotatably coupled to the jarring mass 1424. In further examples the second lifting structure 1442 may be separately rotatably coupled to the mandrel 1412. In such examples the jarring mass 1424 may not necessarily be rotatably coupled to the mandrel 1412.

The lifting structures 1440, 1442 include cooperating cam structures which cooperate during relative rotation therebetween to cause the second lifting structure 1442 to be axially moved in cyclical lifting and dropping phases, thus effecting axial reciprocating movement of the jarring mass 1424.

Loading may be applied between the first and second lifting structures 1440, 1442 which is a function of the biasing force provided by the spring 1434. In this respect such loading may be controlled by appropriate selection of the spring 1434, by the extent of compression of the spring 1434 caused by relative movement between the mandrel 1412 and housing 1414, and by virtue of the load limiting effect of the thrust bearing 1410, which will be described in more detail below. This may assist to increase the longevity of the first and second lifting structures, and thus of the lifting assembly.

The jarring apparatus 1400 further includes an optional releasable rotary connection 1444 between the mandrel 1412 and housing 1414. In the present example the releasable rotary connection 1444 includes a splined connection. When the apparatus 1400 is configured as shown in FIG. 23, the releasable rotary connection 1444 is engaged, and the mandrel 1412 and housing 1414 are rotatably coupled. Such a configuration may thus prevent any jarring to occur, to the extent that this configuration may be defined as a non-jarring configuration. Further, the rotary connection 1444 may allow torque to be transmitted between the mandrel 1412 and housing 1414, which may be useful or required in many applications, such as in drilling applications and the like.

When jarring is to be performed, the mandrel 1412 and housing 1414 are axially moved relative to each other (in the relative direction of arrows 1416, 1417) to disengage the rotary connection 1444, as illustrated in FIG. 24, thus permitting relative rotational movement to be achieved to operate the lifting assembly 1438 and lift/drop the jarring mass 1424 to generate jarring. In some applications the housing 1414 may be held stationary, such that the relative movement is achieved by moving, for example pulling, and rotating the mandrel 1412. Such axial movement, in addition to releasing the rotary connection 1444, causes the annular shoulder 1436 of the mandrel 1412 to pick up and energise the spring 1434, thus establishing the bias force acting against the jarring mass 1424 in the direction of arrow 1416.

Although not shown, the apparatus may further comprise a releasable axial connection between the mandrel 1412 and housing 1414 which first needs to be disengaged to allow the relative axial movement. Such a releasable axial connection may be releasable upon application of a threshold release force applied between the mandrel 1412 and housing 1414.

In the configuration of FIG. 24, the mandrel 1412 has been moved until the thrust bearing 1410 is engaged, such that further axial loading applied between the mandrel 1412 and housing 1414 (e.g., by increasing an overpull on the mandrel 1412) will be transmitted via the thrust bearing 1410 and thus diverted from the spring 1434 and the lifting assembly 1438. In this configuration the spring 1434 may be considered to provide its maximum bias force, subject to any minor variation caused by the cyclical lifting of the jarring mass 1424 by the lifting assembly 1438.

While FIG. 24 illustrates the thrust bearing 1410 fully engaged, it should be understood that jarring may be effected at any stage following release of the rotary connection 1444 and energising of the spring 1434. In this respect, the extent of axial loading applied between the mandrel 1412 and housing 1414, prior to engagement of the thrust bearing 1410, will dictate the level of bias force developed by the spring 1434 and thus the level of jarring forces created within the apparatus 1400. In this respect, a user may control the jarring force output by controlling the overpull on the mandrel 1412, up until the load limit has been reached via engagement of the thrust bearing 1410. This can provide a significant degree of operational flexibility within the apparatus 1400, while minimising risk of overloading.

It should be understood that the examples provided herein are merely exemplary of the present disclosure and that various modifications may be made thereto without departing from the scope defined by the claims.

The invention claimed is:

1. A thrust bearing comprising:
    first and second bearing assemblies rotatable relative to each other;
    a plurality of axially arranged bearing stages formed between the first and second bearing assemblies, wherein each bearing stage comprises:
        a first load shoulder provided on the first bearing assembly;
        a second load shoulder provided on the second bearing assembly;
        a bearing structure defined between the first and second load shoulders; and
        an extrudable component forming part of the bearing structure,
    wherein axial load applied between the first and second bearing assemblies in a first relative axial direction is transmitted between respective pairs of first and second load shoulders via the extrudable components of respective bearing structures; and
    wherein the extrudable components provide for load balancing between each bearing stage.

2. The thrust bearing according to claim 1, wherein the bearing stages are preconfigured to a load balanced configuration by extrusion of the extrudable components.

3. The thrust bearing according to preceding claim 1, wherein at least one bearing stage comprises a single extrudable bearing component between the first and second load shoulders.

4. The thrust bearing according to claim 3, wherein a bearing interface is formed between the extrudable component and one of the first and second load shoulders.

5. The thrust bearing according to claim 4, wherein at least one bearing stage comprises a port in communication with the bearing structure, and wherein the port is offset from the bearing interface.

6. The thrust bearing according to any of claim 4, wherein the extrudable component comprises a portion with increased resistance to extrusion, and wherein the portion with increased resistance to extrusion is located axially away from the bearing interface.

7. The thrust bearing according to claim 4, wherein the extrudable component comprises an extrudable material with an axial gradient of resistance to extrusion, and wherein the extrudable material has increased resistance to extrusion with axial distance from the bearing interface.

8. The thrust bearing according to claim 1, wherein at least one bearing stage comprises multiple extrudable components between the first and second load shoulders, and wherein a bearing interface is formed between two of the extrudable components.

9. The thrust bearing according to claim 1, wherein the bearing stages are configured such that the extrudable components are displaceable out of a region axially between the respective pairs of first and second load shoulders to permit individual adjustment of an axial spacing between the respective pairs of first and second load shoulders to provide for load balancing between each bearing stage.

10. The thrust bearing according to claim 1, further comprising a pre-load arrangement.

11. The thrust bearing according to claim 1, wherein at least one bearing stage further comprises at least one anti-extrusion arrangement.

12. The thrust bearing according to claim 11, wherein the at least one anti-extrusion arrangement is configured to prevent leakage of the extrudable component from its bearing stage while permitting the extrudable component to extrude for load balancing between each bearing stage.

13. The thrust bearing according to claim 11, wherein the at least one anti-extrusion arrangement comprises an extrudable or deformable component.

14. The thrust bearing according to any powering claim 1, further comprising at least one axially arranged reverse bearing stage configured to transmit an applied axial load in a second relative axial direction.

15. The thrust bearing according to claim 1, wherein at least one bearing stage comprises a mechanical bearing assembly, wherein the mechanical bearing assembly forms part of the bearing structure.

16. The thrust bearing according to claim 1, wherein the extrudable component comprises at least one of an extrudable polymer, a composite material having portions with increased resistance to extrusion, a liquid, a gel, and a viscous substance.

17. A method of operating a thrust bearing comprising:

applying an axial load in a first relative direction to a thrust bearing, the thrust bearing comprising:

first and second bearing assemblies rotatable relative to each other; and a plurality of axially arranged bearing stages formed between the first and second bearing assemblies, wherein each bearing stage comprises:
  a first load shoulder provided on the first bearing assembly;
  a second load shoulder provided on the second bearing assembly;
  a bearing structure defined between the first and second load shoulders; and
  an extrudable component forming part of the bearing structure;

the method further comprising:

transmitting the axial load between respective pairs of first and second load shoulders via the extrudable components of respective bearing structures;

wherein the extrudable components provide for load balancing between each bearing stage.

18. The method according to claim 17, further comprising:
extruding a portion of the extrudable component from at least one respective bearing structure while the thrust bearing is under axial load to provide the load balancing between the bearing stages of the thrust bearing.

19. The method according to claim 17, wherein each bearing stage is preconfigured to a substantially load balanced configuration by extrusion of the extrudable component from the respective bearing structures.

20. A method of manufacturing a thrust bearing comprising:

providing first and second bearing assemblies for relative rotation with each other;

providing a plurality of axially arranged bearing stages between each of the first and second bearing assemblies, wherein each bearing stage is provided with:
  a first load shoulder on the first bearing assembly;
  a second load shoulder on the second bearing assembly;
  a bearing structure defined between the first and second load shoulders; and
  an extrudable component forming part of the bearing structure,
wherein the extrudable components are provided for load balancing between each bearing stage.

21. The method of claim 20, further comprising:
applying an axial load in a first relative axial direction between the first and second bearing assemblies, wherein the axial load is transmitted between respective pairs of first and second load shoulders via the extrudable components of respective bearing structures;
extruding a portion of extrudable component from at least one of the respective bearing structures until the axial load substantially balanced between the bearing stages.

* * * * *